(12) United States Patent
Novotny et al.

(10) Patent No.: US 6,751,395 B1
(45) Date of Patent: Jun. 15, 2004

(54) MICRO-ELECTRO-MECHANICAL VARIABLE OPTICAL ATTENUATOR

(75) Inventors: Vlad Novotny, Los Gatos, CA (US); Yee-Chung Fu, Fremont, CA (US); Zuo Wang, San Jose, CA (US)

(73) Assignee: Active Optical Networks, Inc., Fremont, CA (US)

( * ) Notice: Subject to any disclaimer, the term of this patent is extended or adjusted under 35 U.S.C. 154(b) by 0 days.

(21) Appl. No.: 10/010,786

(22) Filed: Nov. 9, 2001

(51) Int. Cl.[7] .................................................. G02B 6/26
(52) U.S. Cl. ......................................... 385/140; 385/39
(58) Field of Search ............................ 385/15, 27, 39, 385/140; 438/50–53, 459

(56) References Cited

U.S. PATENT DOCUMENTS

| | | | | |
|---|---|---|---|---|
| 5,724,123 | A | 3/1998 | Tanaka | 356/5.01 |
| 5,872,880 | A | 2/1999 | Maynard | 385/88 |
| 5,923,798 | A * | 7/1999 | Aksyuk et al. | 385/19 |
| 6,028,689 | A | 2/2000 | Michalicek et al. | 359/224 |
| 6,075,239 | A * | 6/2000 | Aksyuk et al. | 250/229 |
| 6,097,859 | A | 8/2000 | Solgaard et al. | 385/17 |
| 6,163,643 | A | 12/2000 | Bergmann et al. | |
| 6,173,105 | B1 * | 1/2001 | Aksyuk et al. | 385/140 |
| 6,222,656 | B1 * | 4/2001 | Eu | 398/9 |
| 6,246,826 | B1 * | 6/2001 | O'Keefe et al. | 385/140 |
| 6,252,466 | B1 | 6/2001 | Kawamura | 331/25 |
| 6,253,001 | B1 | 6/2001 | Hoen | 385/17 |
| 6,275,320 | B1 * | 8/2001 | Dhuler et al. | 359/237 |
| 6,283,601 | B1 | 9/2001 | Hagelin et al. | 359/871 |
| 6,301,403 | B1 | 10/2001 | Heanue et al. | 385/18 |
| 6,320,993 | B1 | 11/2001 | Laor | 385/16 |
| 6,410,361 | B2 * | 6/2002 | Dhuler et al. | 438/54 |
| 6,442,324 | B2 * | 8/2002 | Tei et al. | 385/140 |
| 6,465,355 | B1 * | 10/2002 | Horsley | 438/694 |
| 6,553,175 | B2 * | 4/2003 | Jaspan | 385/140 |
| 6,560,396 | B1 * | 5/2003 | Yan et al. | 385/140 |
| 6,563,965 | B1 * | 5/2003 | Al-hemyari | 385/5 |
| 2001/0033731 | A1 * | 10/2001 | O'Keefe et al. | 385/140 |
| 2002/0005976 | A1 * | 1/2002 | Behin et al. | 359/254 |
| 2002/0172452 | A1 * | 11/2002 | Zhang et al. | 385/15 |
| 2003/0031451 | A1 * | 2/2003 | Hong et al. | 385/140 |
| 2003/0053743 | A1 * | 3/2003 | Liu et al. | 385/18 |

OTHER PUBLICATIONS

"Routing Packets with Light," Daniel J. Blumenthal. Scientific American, pp. 96–99. Jan. 2001.
"Construction and performance of a 576×576 single–stage OXC," Herzel Laor. LEOS, San Francisco, California, 3 pages. Nov. 8, 1999.
"Application of micro– and nanotechnologies for the fabrication of optical devices," Wolfgang Ehrfeld and Hans–Dieter Bauer. SPIE vol. 3276, p. 2 and pp. 4–14. (Mar. 1998).
"Performance of a 576×576 Optical Cross Connect," Laor, et al. NFOEC, Chicago, Illinois, pp. 1–5. Sep. 26, 1999.
"Control and shape design of an electrically–damped comb drive for digital switches," Yijian Chen. Proceedings of SPIE vol. 4178, 2000, pp. 387–3943.
"The Rise of Optical Switching," David J. Bishop et al. Scientific American, pp. 88–94. Jan. 2001.
"A Large–Deflection Electrostatic Actuator for Optical Switching Applications," John D. Grade, Hal Jerman and Thomas W. Kenny. Presented at Hilton Head, 2000. 4 pages.

(List continued on next page.)

Primary Examiner—John D. Lee
(74) Attorney, Agent, or Firm—Silicon Edge Law Group LLP; Arthur J. Beniel

(57) ABSTRACT

Variable optical attenuators that use a blade in a gap between two fibers to control the optical attenuation without having coupling optics in the gap, where the blade has at least one blade surface at an angle with respect to an end facet of one fiber.

17 Claims, 15 Drawing Sheets

OTHER PUBLICATIONS

"Flip Chip Challenges," Steve Bezuk, Ph.D. General Manager. Applied Technology Development and Flip Chip Kyocera America, Inc. First published in HDI Magazine, Feb. 2000. 6 pages.

"MEMS Feedback Control Using Through–Wafer Optical Device Monitoring," J.M. Dawson, et al. Proceedings of SPIE vol. 4178, 2000. pp. 221–231.

"A Flat High–Frequency Scanning Micromirror," Robert A. Conant, et al. 2000 Solid–State Sensor & Act Workshop, Hilton Head, S.C., Jun. 4–8, 2000. (4 pages).

"The Surface/Bulk Micromachining (SBM) Process: A New Method for Fabricating Released MEMS in Single Crystal Silicon," Sangwoo Lee, et al. Journal of Microelectromechanical Systems, vol. 8, No. 4, Dec. 1999. pp. 409–416.

"MEMS actuators for silicon micro–optical elements," Norman C. Tien and Daniel T. McCormick. Proceedings of SPIE vol. 4178, 2000. 256–267.

"Lightweight, Optically Flat Micromirrors for Fast Beam Steering," Jocelyn T. Noe, et al. Presented at IEEE/LEOS Optical MEMS 2000 Conference, Aug. 21–4, 2000, Kauai, Hawaii, USA. 2 pages.

"Optical MEMS for Optical Communications—Trends and Developments," Veljko Milanovic. Adriatic Research Institute. pp. 2–6. Downloaded Dec. 20, 2001.

"Silicon micromachines for lighwave networks: the little machines that will make it big," by David Bishop. Dec. 2000. SPIE's Optics & Information Systems. 8 pages, vol. 11, No. 2.

Topical Review "The future of MEMS in telecommunications networks," James A. Walker. J. Micromech, Microeng. 10(2000)R1–R7. Printed in the UK.

D. J. Bishop Presentation. "Silicon Micromachines for Lightwave Networks Can Little Machines Make it Big?", Lucent Technologies, Bell Labs Innovations. 83 pages, Feb., 1999.

U.S. patent application Publication, "Latching Apparatus for a MEMS Optical Switch," by Zhang et al. Pub. No. : US 2002/0172452 A1, Pub. Date: Nov. 21, 2002. Appl. No. : 09/896,300, filed May 18, 2001.

US 2002/0005976 A1, Publication date: Jan. 17, 2002. "Multi–Layer, Self–Aligned Vertical Combdrive Electrostatic Actuators and Fabrication Methods." Inventors: Behrang Behin and Satinderpall Pannu. Filed Mar. 10, 2001, Application No. 09/810,333.

US 2002/0172452 A1, Publication date: Nov. 21, 2002. "Latching Apparatus for a MEMS Optical Switch." Inventors: Nan Zhang, Hong Zhang, and Gary Nault. Filed May 18, 2001. Application No: 09/860,300.

* cited by examiner

MICRO-ELECTRO-MECHANICAL VARIABLE OPTICAL ATTENUATOR

BACKGROUND

This application relates to variable optical attenuators, and more particularly, to variable optical attenuators for use in various optical devices and systems, including optical communication networks.

A variable optical attenuator (VOA) is a device designed to attenuate an intensity or power level of an input optical beam in a controlled manner to produce an output optical beam with different attenuated intensities. Such a device is desirable in various applications including optical fiber devices and optical communication networks.

For example, it may be desirable to place a VOA in front of an optical receiver to limit the received optical power of an incoming optical signal to a certain range to avoid saturation of the optical receiver while still maintaining the signal-to-noise ratio at an acceptable level. In another example, a VOA may be placed to regulate the optical output of a laser diode transmitter without changing its driving current so that the current-dependent laser wavelength and line width are not changed by such power regulation. In a further example, a VOA may be placed between two Erbium Doped Fiber Amplifiers (EDFA) to compensate for the gain tilt caused by the variation in the pumping power. In yet another example, VOAs may be used with a demultiplexer to individually adjust the power levels of different optical channels to form a dynamic gain equalizer for applications such as maintaining signal quality at all optical channels in entire optical networks, especially in long haul networks where multiple stages of optical amplifiers are installed. Furthermore, VOAs may be used in connection with optical add/drop multiplexer (OADM) and optical cross-connect (OXC) switch sites to compensate for the power variation caused by a change in the optical channel number.

Therefore, there is a need for single-channel and multi-channel VOAs, and especially a need for VOAs with integrated packages having power monitoring and servo control adapted for a variety of applications.

BRIEF DESCRIPTION OF THE DRAWINGS

FIGS. 13A1–13A8 and 13B1–13B8 show one exemplary process for fabricating an electrostatic rotational comb actuator shown in FIGS. 8A, 8B, and 8C.

DETAILED DESCRIPTION

Figure 1:
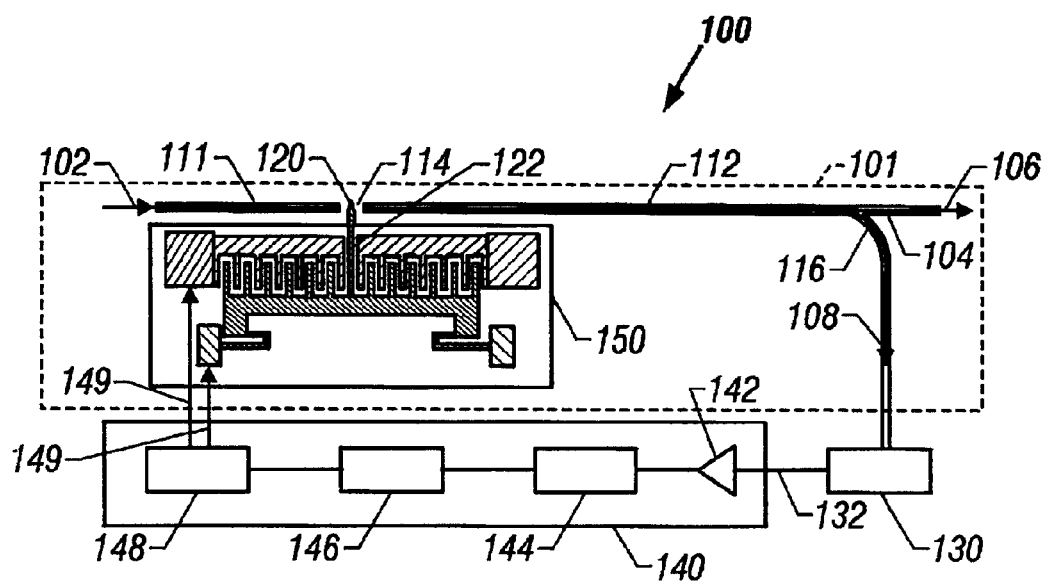
FIG. 1 shows one embodiment of a variable optical attenuator in an integrated package.

The variable optical attenuators of this application utilize fibers to guide optical signals. The variable optical attenuation in a fiber link is achieved by forming an air gap in the fiber line and by using an actuator-driven blade in the air gap to intercept the optical path in the air gap by optical refraction, optical reflection, or a combination of both. A fiber link in such a VOA has an input fiber and an output fiber that are spaced from each other and are optically aligned relative to each other to allow for efficient, free-space optical coupling from the input fiber to the output fiber without collimating optics between the fibers. When the end facets of the both input and output fibers are substantially perpendicular to the fiber axes, the input and output fibers are aligned to have their optic axes coincide with each other. When at least one fiber has an angled end facet, the alignment of the fibers should be arranged in such a way that the axis of the light launched from the input fiber, which is refracted by the facet of the input fiber, should intercept the center of the core of the output fiber so that the light beam overlaps with the optical axis of the output fiber after refraction by the facet of the output fiber. For example, when facets of input and output fibers have the same angle and are aligned in parallel, the axes of the input and output fibers may be spatially shifted laterally while keeping the fibers parallel to each other. The VOA device may be fabricated with grooves for holding and self-aligning the input and output fibers; the blade and its actuator may be integrated on a suitable substrate, such as a semiconductor, to form a micro electromechanical system (MEMS). The control mechanism for the VOA, including control electronic circuits, may be either integrated on the same substrate or located off the chip on a separate substrate. The input and output fibers may be structured so that the numerical aperture of the output facet of the input fiber substantially matches that of the input facet of the output fiber. The gap between the two end facets is set to be sufficiently small so that the optical coupling from the input fiber to the output fiber is a direct free space coupling through the air gap and the loss of optical coupling is very small in the absence of the intervention of the blade. For example, the optical loss in the direct coupling of single mode fibers is about 0.2 dB and 1 dB for gaps of 30 and 60 microns respectively. In general, the optical loss decreases with the gap and vice versa. Since the gap should be large enough to accommodate free motion of the blade in the gap, the size of the gap may be limited to a range approximately between 10 and 100 microns, or more preferably between about 10 to 50 microns in many designs of the blade.

Notably, this direct fiber-to-fiber optical coupling design eliminates the conventional coupling optics between the two fibers where the air gap is generally so large that the propagation in free space causes significant spatial spread of the beam due to the beam divergence and hence the beam needs to be collimated and focused into the receiving fiber. Hence, the conventional fiber-to-fiber coupling is indirect and is achieved through placing optical lenses between the fibers to collimate output light from the input fiber and to focus the light into the output fiber. The present design is based on direct coupling and thus significantly simplifies the optical configuration of the VOAS. As a result, the device structure, the optical alignment, the manufacturing cost, and the reliability of the device are improved in comparison with devices that use two collimating lenses between the fibers.

The actuator-driven blade may be a micro-electro-mechanical blade fabricated on the substrate which holds the input and output fibers. The blade may have a thickness of several microns to tens of microns in order to freely move in the small gap between the fibers. The blade may have a lateral reflective surface to attenuate the light by optical reflection or be transparent or partially transparent to attenuate the intercepted light by optical refraction. In the design where the optical axes of input and output fibers coincide with each other, the blade may have at least a front surface that forms an angle with respect to the optic axes of the input and output fibers so that the light in the gap is intercepted by this angled surface to mitigate optical reflection back to the input fiber.

When the blade intercepts partially or completely the light from the input fiber, the intercepted part of the light is generally split to three parts by the blade: back reflected light, the refracted light, and multiply refracted and reflected light. The multiply refracted and reflected light is much weaker than refracted and reflected light and has larger incident angle and larger lateral shift from the core of the fibers. Hence, the effects of the multiply refracted and reflected light will be neglected thereafter. The refracted light will have negligible coupling to the output fiber due to its altered incident angle and lateral displacement to the fiber core for a properly-designed blade. Therefore, two basic requirements for the blade of the VOA are to prevent the refracted beam from being forwardly coupled to the output fiber and to eliminate the reflected light from being backwardly coupled into the input fiber. The back reflection and refraction may be decoupled from the fibers if they either are laterally shifted away from the core of the input fiber and output fiber respectively or have an incident angle greater than the maximum incident angle of the input fiber and the output fiber respectively. The sine function of the maximum incident angle is equal to the numerical aperture, NA, of the fiber. The NA for a typical single-mode fiber is about 0.14, which corresponds a maximum incident angle of about 8 degrees.

The actuator, which is engaged to the micro blade to control the position of the micro blade, may be micromachined as a MEMS component and as an integral part of the substrate to precisely control the position and movement of the blade to produce a variable optical attenuation. Electro-static, electro-magnetic rotational or piezoelectric actuators, for example, may be used.

An active, closed-loop control mechanism may be implemented to dynamically control the position of the micro blade to maintain the optical power in the output fiber at a desired level by monitoring the optical power in the output fiber. An optical coupler may be formed in the output fiber or attached to the output fiber to split a small fraction of the power in the output fiber as a monitor beam. The monitor beam is fed into an optical detector, which produces an output representing the optical power in the output fiber. An actuator control circuit, coupled to the optical detector and the actuator, is used to adjust the actuator according to the measured optical power.

In one implementation, a variable optical attenuator based on the above design may be fabricated and integrated on a silicon substrate. One or two grooves may be formed on the substrate to automatically align and precisely hold the input and output fibers at their respective desired positions. The micro blade and the actuator may be formed from micro mechanical structures fabricated on the substrate. The optical detector and the actuator control circuit may also be directly fabricated on or engaged to the substrate.

FIG. 1 shows one embodiment of a variable optical attenuator 100 formed on a Si substrate 101 in an integrated package. Two fibers 111 and 112 are laid in a groove fabricated on the substrate 101 to align with each other and are spaced by a gap 114. The groove in the substrate 101 may be a V-shaped groove etched in the single-crystal materials such as Si or other shaped grooves such as a rectangular or U-shaped grooves by using, e.g., a wet etching process or other suitable etching processes. The gap 114 is small so that the spatial spread of the output beam from the fiber 111 due to the beam divergence at the output fiber 112 is negligible and the associated optical loss is small, e.g., less than 0.5 dB. A micro blade 120 is engaged to an actuator 150 and positioned to move in the gap 114 in a controlled manner. The micro blade 120 may be formed from the substrate material, such as Si, and has a support arm 122 that engages to the actuator 150 to support and move the blade 120. The input fiber 111 receives an input beam 102. At least a portion of the input beam 102 is coupled through the gap 114 into the output fiber 112 as an output beam 104. As the position of the micro blade 120 varies in intercepting the beam in the gap 114, the power of the output beam 104 varies accordingly.

An optical splitter 116 is formed or engaged to the output fiber 112 to split a fraction of, e.g., a few percent, of the output beam 104 to produce a monitor beam 108. Fibers may be used to carry the beams 104 and 108. The optical splitter 116 may be implemented in various configurations. For example, a portion of the fiber 112 may be side-polished to remove a portion of the fiber cladding to form an optical port through which the optical energy in the fiber 112 can be evanescently coupled out of the fiber 112 to produce the monitor beam 108. Also, the fiber 112 may be cut to have an output facet at the location of the splitter 116 and a beam splitter 116 may be used to produce the monitor beam 108. In yet another example, an angled fiber Bragg grating may be fabricated in the output fiber 112 so that a small fraction of light is reflected in the direction normal to the optical axis of fiber to produce the monitor beam 108.

An optical splitter 116 is formed or engaged to the output fiber 112 to split a fraction of, e.g., a few percent, of the output beam 104 to produce a monitor beam 108. Fibers may be used to carry the beams 104 and 108. The optical splitter 116 may be implemented in various configurations. For example, a portion of the fiber 112 may be side-polished to remove a portion of the fiber cladding to form an optical port through which the optical energy in the fiber 112 can be evanescently coupled out of the fiber 112 to produce the monitor beam 108. Also, the fiber 112 may be cut to have an output facet at the location of the splitter 116 and a beam splitter 116 may be used to produce the monitor beam 108. In yet another example, an angled fiber Bragg grating may be fabricated in the output fiber 112 so that a small fraction of light is reflected in the direction normal to the optical axis of fiber to produce the monitor beam 108.

The control mechanism includes an optical detector 130 and a feedback control circuit 140, both of which may be formed either on the substrate 101 or off the substrate 101 and on a separate substrate. The optical detector 130 may be a photodiode or other photosensing device to convert the power of optical monitor beam 108 into an electrical detector signal 132. The control circuit 140, electrically coupled to the detector 130, processes the detector signal 132 to produce a control signal 149 that drives the actuator 150. In one implementation, the circuit 140 may include an amplifier 142, an analog-to-digital converter 144, a digital servo controller 146, and a digital-to-analog converter 148. An actuator driving circuit may be used to amplify the output signal from the converter 148 to drive the actuator 150. In operation, the digital servo controller 146 compares the measured power of the beam 104 to a desired power level to generate an error signal. The control signal 149, therefore, is generated to control the intercepting position of the micro blade 120 to reduce or minimize the deviation of the measured power from the desired power.

The blade 120 may be optically transparent, semitransparent or reflecting. A transparent or semitransparent blade may have bare surfaces without any coating. An optically-reflective blade may also have bare surfaces, or alternatively, may be coated with highly reflective films. With uncoated transparent or semitransparent blade 120, the optical attenuation is effectuated by decoupling the transmitted light from output fiber 112 by either laterally shifting the transmitted beam, or by changing the direction of the transmitted beam, or by a combination of both. The blade may be designed to have a reflective blade surface facing the input fiber to attenuate light coupled into the fiber 112 by reflection. The reflective surface may be achieved by forming the blade with a metal or other reflective material or coated with a reflective coating, e.g., one or more metallic or dielectric layers.

FIGS. 2A through 2C and 3A through 3D illustrate exemplary embodiments of the designs for the relative arrangement of the fibers 111 and 112 and the associated designs for the blade 120 in FIG. 1 which may operate in either the reflective blade design or the refractive blade design.

Figure 2A:
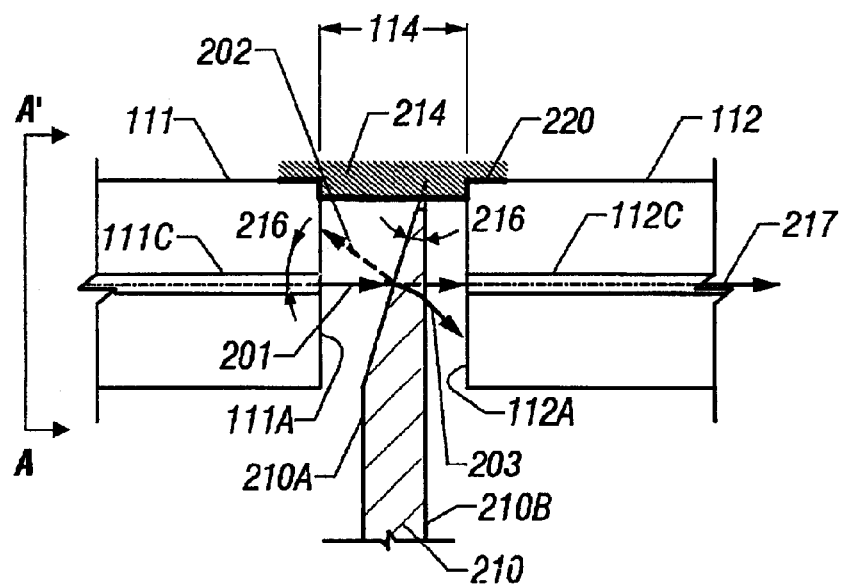
FIGS. 2A, 2B, and 2C show first set of embodiments of a micro blade and fiber arrangement in the device of FIG. 1.
Figure 2B:
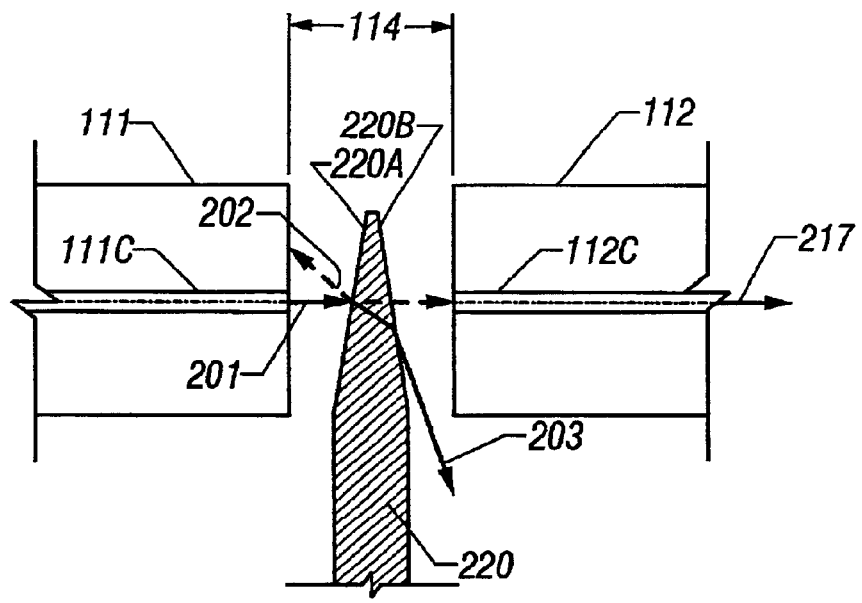
Figure 2C:
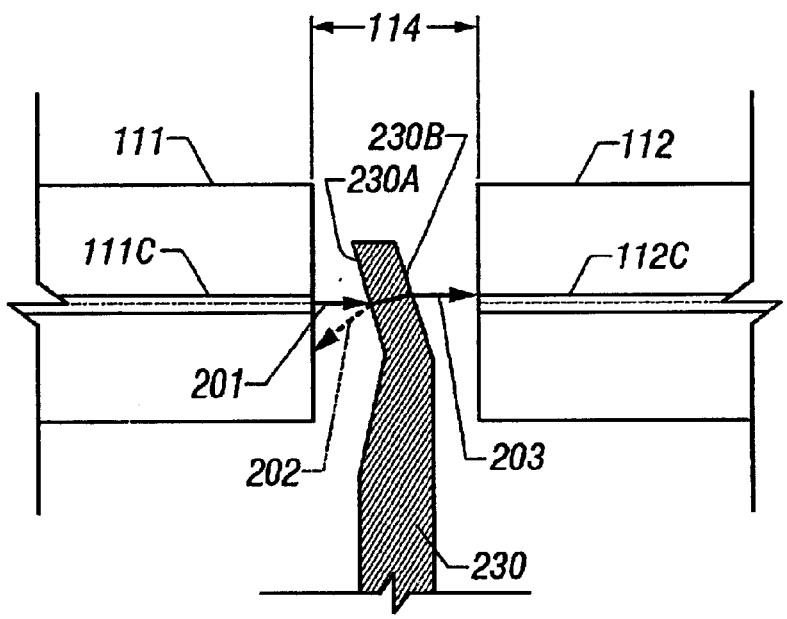

In the embodiments shown in FIGS. 2A through 2C, the input and output fibers 111 and 112 are aligned in a groove formed in the underlying substrate to have their optic axes coincide with each other. End facets 111A and 112A of the fibers 111 and 112, respectively, are cut to be substantially perpendicular to the fiber cores 111C and 112C so that the propagation direction of the output beam of the input fiber is substantially along the fiber optic axis and remains so in the gap 114. To eliminate the back reflection, both facets of the fibers may be coated with anti-reflective coatings or films. A single groove may be fabricated on the support substrate to align and hold the two fibers 111 and 112.

In the embodiments shown in FIGS. 3A through 3D, however, the input and output fibers 111 and 112 are aligned to have their optic axes parallel to each other and are laterally shifted so that their fiber cores 111C and 112C do not face each other. The end facet of each fiber is cut at an acute angle with respect to the fiber core or the optic axis. Hence, the light changes its direction upon entering into or exiting the fiber through the end facet. The propagation direction of the output beam from the fiber 111 is at an angle with respect to the optic axis and directs at the fiber core of the fiber 112 in absence of the intervention by the blade. In such a fiber arrangement, two parallel but slightly laterally shifted grooves are needed on the substrate 101 to respectively hold the fibers 111 and 112. The advantage of these angle-cut fiber configuration is that the fiber end facets may not necessarily need to be coated with anti-reflective films.

In the fiber arrangements shown in FIGS. 2A through 2C, each blade is designed to have a blade surface that faces the input fiber to form an angle with respect to the fiber axes. In FIG. 2A, a blade 210 has a slanted blade surface 210A facing the input fiber 111. The slanted blade surface 210A forms an angle 216 with respect to the line perpendicular to optical axes of the fibers 111 and 112, where the acute angle 216 may be equal to or greater than half of the maximum incident angle of the fibers, which is about 8 degrees for a typical commercial single-mode fiber. The opposite blade surface 210B is shown to be substantially perpendicular to the axes of the fibers 111 and 112. As illustrated, an output beam 201 from the input fiber 111 propagates towards the fiber core 112C of the fiber 112 in free space. The blade 210, when uncoated and placed in the gap 114, reflects a portion of the beam 201 as a reflected beam 202 by the slanted surface 210A and transmits the other portion of the beam 201 as a transmitted beam 203. The reflected beam 202 directs away from the fiber core 111C due to the angle 216 of the slanted surface 210A to reduce optical back reflection to the fiber 111. Due to the angle of the reflection, even when the reflected beam 202 impinges upon the fiber core 111C of the fiber 111, the coupling can be significantly reduced in comparison with the coupling when the reflected beam is parallel to the fiber core 111C of the fiber 111. Due to the refraction at both surfaces 210A and 210B, the transmitted beam 203 is also directed at an angle with respect to the optic axis of the fiber 112. Therefore, the transmitted portion of the intercepted beam can be decoupled from output fiber and lead to the attenuation if its incident angle to the output fiber is equal to or greater than the maximum incident angle of the output fiber. The position of the blade 210 in the gap 114 between the fibers 111 and 112 can be varied to control the portion of the beam 201 to be intercepted by the blade 210 and hence the optical coupling into the fiber 112. When the beam 201 is completely intercepted by the blade 210, the coupling to the fiber 112 is minimum, which may be set at zero or a desired low power level. Alternatively, the blade 210 may be coated with a reflective layer on at least the surface 210A to attenuate the beam 201 by reflection. The intercepted portion of the beam 201 is completely reflected into the beam 202 without transmission.

FIG. 2B shows a blade 220 which has two symmetric and opposing slanted blade surfaces 220A and 220B. The angle of the two blade surfaces 220A and 220B is set to allow sufficient change of the direction of the reflected and transmitted beam to reduce coupling back to the input fiber 111 and to control the coupling to the output fiber 112. Like other embodiments, the blade 220 may be either uncoated or coated with high reflective coating on at least the front surface 220A.

In FIG. 2C, a micro blade 230 is shown to have two parallel blade surfaces 230A and 230B that form an angle with respect to the optic axes of the fibers 111 and 112. This angle allows the reflected beam 202 to be directed away from the fiber core 111C to reduce the coupling back to the fiber 111. When the blade 230 is uncoated, the transmitted beam 203 is laterally shifted without changing the beam direction due to the refraction at the two parallel surfaces 230A and 230B. The thickness of the blade 230, i.e., the distance between the surfaces 230A and 230B, is designed to produce a sufficient shift so that the center of the transmitted beam 203 is away from the fiber core 112C of the fiber 112 to attenuate the beam received by the fiber 112.

Figure 3A:
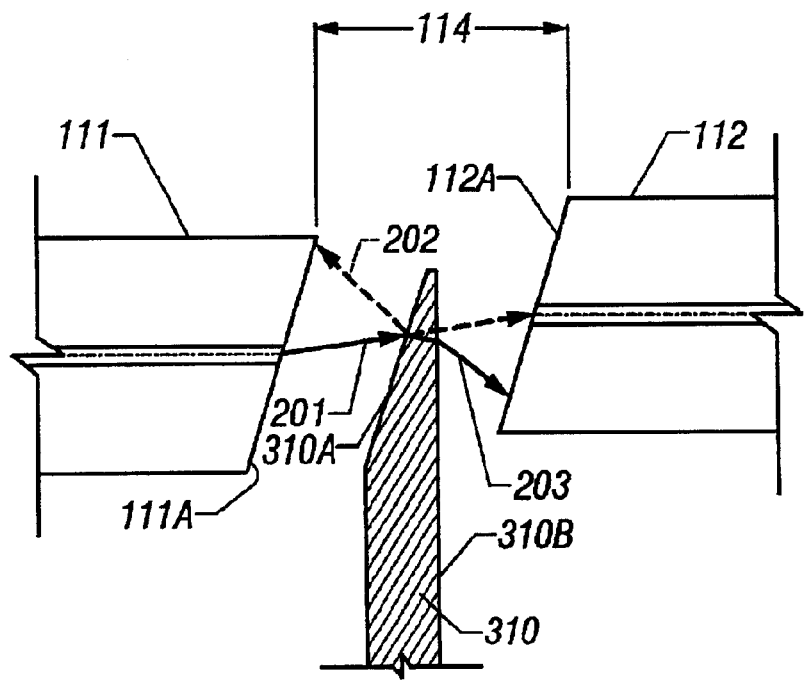
FIGS. 3A, 3B, 3C, and 3D show second set of embodiments of a micro blade and fiber arrangement in the device of FIG. 1.

FIG. 3A shows a uncoated blade 310 with a slanted front surface 310A with an angle to the optic axis of the fiber 111 and a back surface 310B that is substantially perpendicular to the optic axis of the fiber 112. This blade design is similar to the blade 210 in FIG. 2A but is used in a laterally shifted fiber configuration for the angle-cut fibers 111 and 112.

Figure 3B:
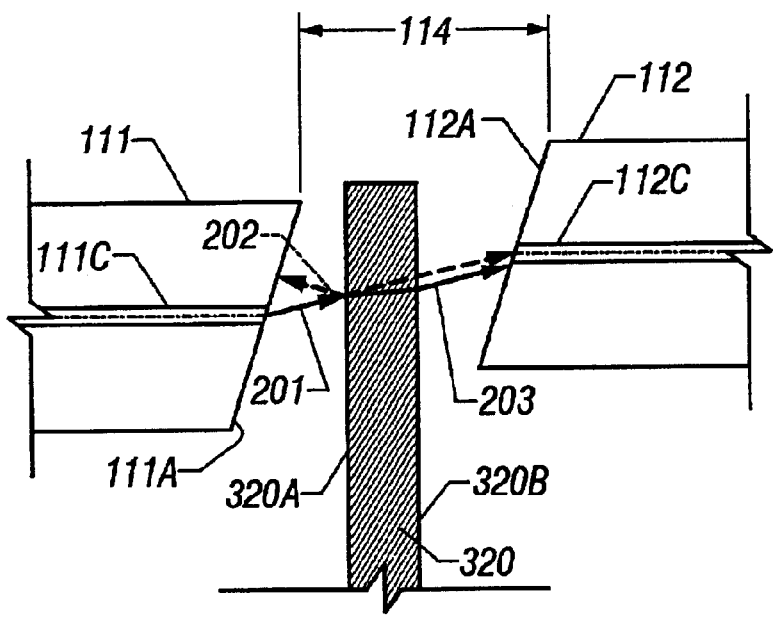

FIG. 3B shows a transparent or semitransparent blade 320 with both blade surfaces 320A and 320B parallel to each other and perpendicular to the fiber axes of the fibers 111 and 112. The fibers 111 and 112 are in a laterally shifted fiber arrangement so that the end facet 111A is not parallel to the surface 320A. The angle of the end facet 111A is selected so that the reflected beam 202 is either reflected away from the fiber core 111C to directly increase the optical return loss, or reflected at a sufficient angle relative to the fiber core 111C to reduce the optical coupling back to the fiber 111. The angle of the end facet of each fiber and the thickness of the blade 320 may be selected to produce a lateral shift in the position of the transmitted beam 203 away from the fiber core 112C of the fiber 112 in the transmission mode. If the front surface of the blade 320 is reflective, the thickness of the blade 320 may be freely selected.

Figure 3C:
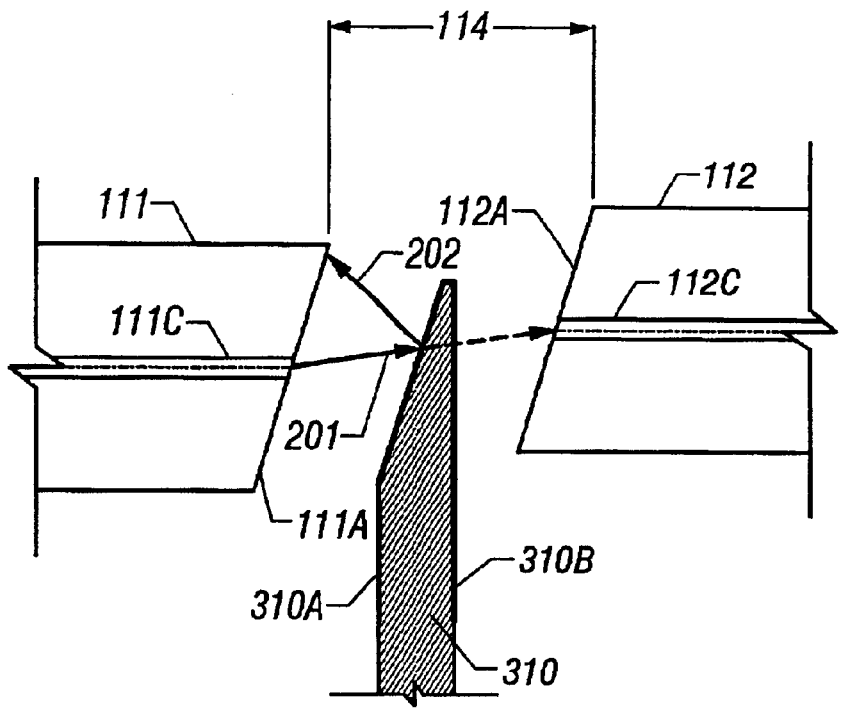
Figure 3D:
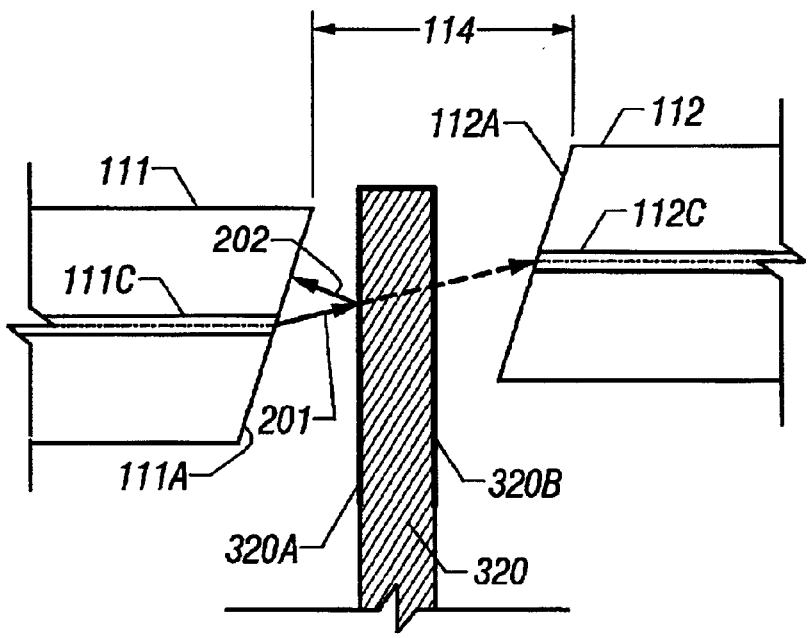

FIG. 3C shows a variation of the design in FIG. 3A where the blade 310 is optically reflective to attenuate light by reflection. The blade 310 may be formed of a metal or a transparent or partially transparent material but coated with a reflective coating on at least the front blade surface 310A. FIG. 3D shows a variation of the design in FIG. 3B where the front surface 320A or each of the surfaces 320A and 320B of a blade 320 is reflective. Because the thickness of the blade is no longer used to produce a lateral shift in the beam position on the fiber 112, the blade can be made as thin as practically possible to reduce the gap 114 between the fibers 111 and 112. In one implementation, for example, the reflective blade 320 may be 5 microns in thickness to achieve a gap as small as about 15 microns with a spacing of about 5 microns on each side of the blade from the end facet 111A or 112A.

In the cases as shown in FIGS. 3A–3D, the anti-reflective coating on fiber facets can be eliminated if the cut angle of the fiber is equal or greater than its maximum incident angle.

Notably, the optical configurations shown in FIGS. 2B, 2C, 3B, and 3D are optically symmetrical in that the VOAs can operate in the same way whether the input optical signal is received from the fiber 111 or in the opposite direction from the fiber 112. Therefore, the VOAs based on the designs in FIGS. 2B, 2C, 3B, and 3D are suitable for applications in bidirectional optical devices and networks.

The above direct fiber-to-fiber coupling configurations can be used to eliminate anti-reflective coatings on various optical surfaces such as the slanted blade surfaces in the transmission mode and slanted end facets of the fiber to reduce the manufacturing cost and complexity. When end fiber facets are perpendicular to the optical axis, anti-reflective coatings are highly desirable on facets 111A and 112A to reduce the unwanted back reflection. In addition, the blade designs can be micromachined to reduce the blade thickness to about 10 microns or less to achieve a small gap between fibers for direct fiber-to-fiber coupling without coupling optics. Furthermore, the input and output fibers 111 and 112 may not be parallel to each other but form an angle between their optical axes where the angles of the end facets of the fibers 111 and 112 and the angle of the front surface of the blade 120 are designed to allow the beam output from the input fiber 111 to be directly coupled through the gap 114 into the fiber 112.

Figure 4:
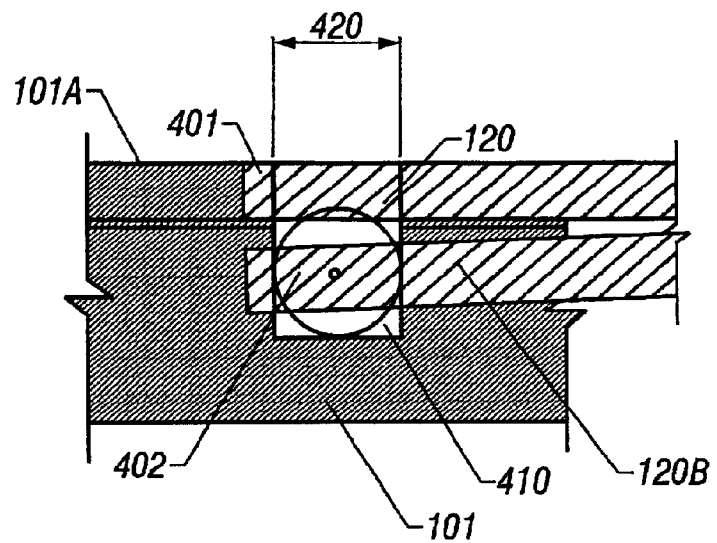
FIG. 4 shows additional details of the device of FIG. 1 and the operation of the micro blade.

FIG. 4 shows a cross sectional view of the devices in FIGS. 2A through 3D along lines AA' as shown in FIG. 2A to illustrate the operation of the actuator-driven blade 120 of FIG. 1. The actuator 150 is assumed to be a rotational actuator that rotates the support arm 122 (also of FIG. 1) and the blade 120. The micro blade 120 is shown to be in two positions 401 and 402 due to rotation caused by the actuator 150. The position 402 is closer to the optic axis in the center of the fiber core than the position 401. Hence, the attenuation at the position 402 is higher than that at the position 401. In fact, position 401 is chosen so that light is intercepted by the blade at that position. One advantage of the rotational actuator is that the length of the support arm 122 of the blade 120 may be sufficiently long to amplify the movement of the blade 120. Hence, a small movement at the base of the support arm 122 near the rotational axis causes an amplified movement of the blade 120 at the tip of the support arm 122.

FIG. 4 further shows that, in addition to the substrate 101, a second substrate 101A is integrated to the substrate 101 by a proper bonding to form the integrated variable optical attenuator. As illustrated, the bottom substrate 101 is fabricated to have a groove 410 to align and hold the fibers 111 and 112. The top substrate 101A is also fabricated to have a slot 420 to accommodate the fibers 111 and 112. In particular, this two-substrate configuration is used to support an actuator that has two separate parts that move relative to each other. In actual devices, a portion of the top substrate 101A is bonded to the layers over the substrate 101 so that the final structure is an integrated package.

Figure 5A:
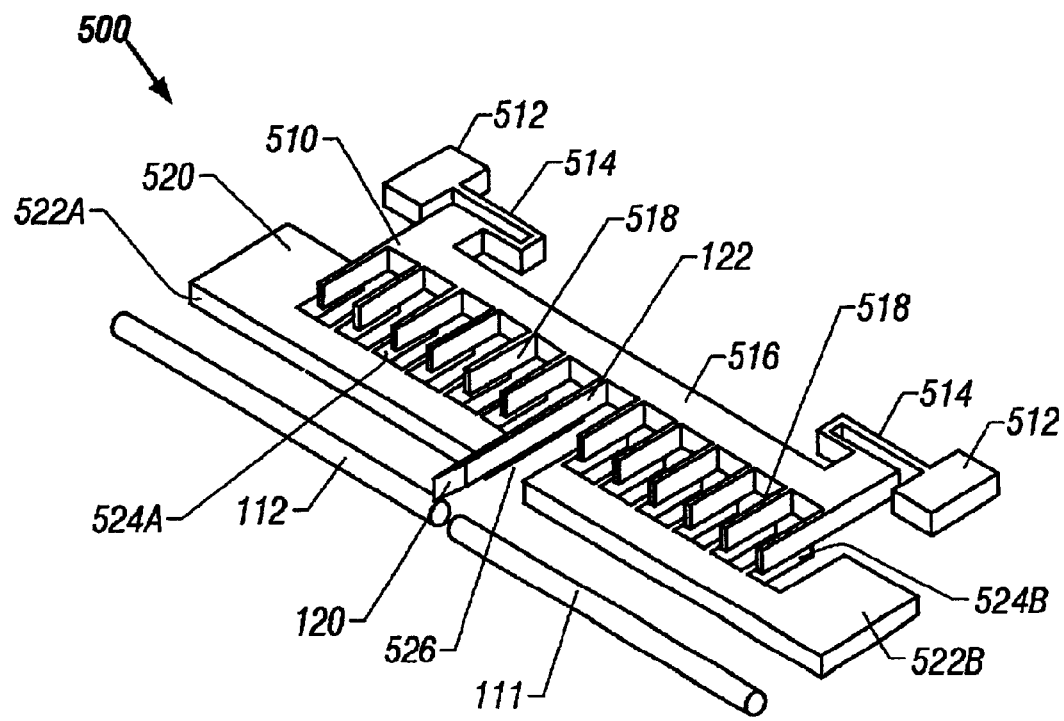
FIGS. 5A and 5B show schematic structure and operation of an electrostatic rotational comb actuator according to one embodiment.
Figure 5B:
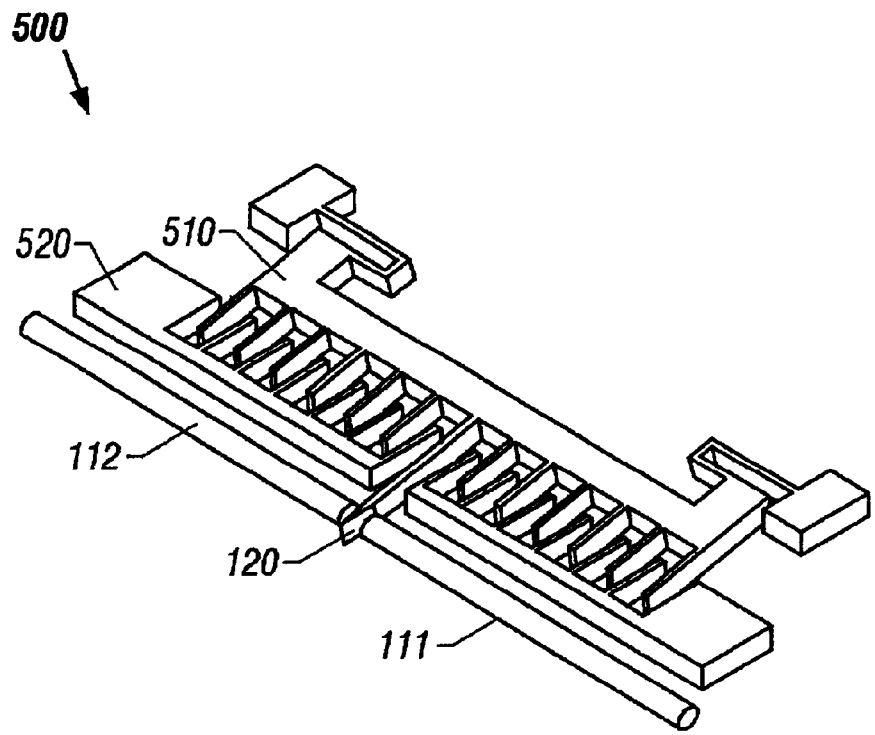

FIGS. 5A and 5B show an exemplary electrostatic rotational comb actuator 500 suitable for the VOA in FIG. 1. The actuator 500 includes a stationary part 520 fabricated on the substrate 101 and a movable part 510 fabricated on the substrate 101A. The substrate 101 as shown in FIG. 4 has a groove 410 to hold the fibers 111 and 112 so that fibers 111 and 112 are stationary relative to the stationary part 520 of the actuator 500. The stationary part 520 includes a first stationary part 522A and 522B that separate from each other by a gap 526 to allow for movement of the micro blade 120 and its support 122. Both parts are patterned to have stationary comb teeth 524A and 524B arranged in a linear array parallel to the fibers 111 and 112. The comb teeth 524A and 524B are conductive and are connected to a common electrical potential.

The movable part 510 includes a movable arm 516 patterned to have movable conductive teeth 518 and the support arm 122 with the micro blade 120. The movable teeth 518 are arranged to spatially interleave with the stationary teeth 524A and 524B in the stationary part 520 to form an array of capacitors between two adjacent teeth 518 and 524A (or 524B). The movable teeth 518 are set at a common potential that is different from the potential of the stationary teeth 524A and 524B. The potential difference between the potential on the movable teeth 518 and the potential on the stationary teeth 524A and 524B cause an electrostatic torque on the movable structure. Hence, the potential difference can be controlled and varied to control the rotation and therefore the position of the movable teeth 518 and the micro blade 120.

More specifically, the substrate 101A is fabricated to have two fixed parts 512 and two resilient hinges or springs 514 to rotatably engage the movable arm 516 to the substrate 101A. The hinges 514 may be torsional hinges or bending hinges. In one implementation, each spring 514 may be patterned into a serpentine configuration which has one part attached to the movable arm 516 and another part attached to its respective fixed part 512 to operate as a rotational hinge for the movable arm 516. The two hinges 514 define the rotational axis of the movable arm 516. Alternatively, the serpentine hinges 514 as illustrated in FIG. 5A may be orientated 90 degrees to be serpentine bending hinges. However implemented, in the absence of any electrostatic interaction between the stationary teeth 524A, 524B and movable teeth 518, the torsional forces of the springs 514 keep the movable arm at a position at which the micro blade is outside the gap 526 between the fibers 111 and 112. At this state, the optical signal from the fiber 111 is completely coupled into the fiber 112 without attenuation (FIG. 5A). When the potential difference between the teeth 524A, 524B and 518 is controlled to produce an electrostatic force to pull the movable teeth 518 towards the stationary teeth 524A, 524B, the micro blade can intercept the beam between the gap 114 by an amount determined by the potential difference (FIG. 5B).

In general, the substrates 101 and 101A (FIG. 4) may be formed of a range of solid-state materials. Typically, dielectric materials such as semiconductors and glasses are used. In one implementation, the top and bottom substrates 101 and 101A may be a semiconductor material such as Si that is doped prior to the fabrication to be electrically conductive. The doping may be either n-type or p-type. The semiconductor material may be a single-crystal material or a polycrystalline material. Alternatively, the top and bottom substrates 101 and 101A may be formed of a non-conductive material such as a glass material but are coated with an electrically conductive layer (e.g., a metallic coating). Moreover, the top and bottom substrates 101 and 101A may be formed of an electrically conductive material such as a metal or a polymer material.

FIG. 1 shows a VOA with only one optical channel in a predefined direction from the input fiber 111 to the output fiber 112. This basic design may be expanded to form more complex VOA devices.

Figure 6:
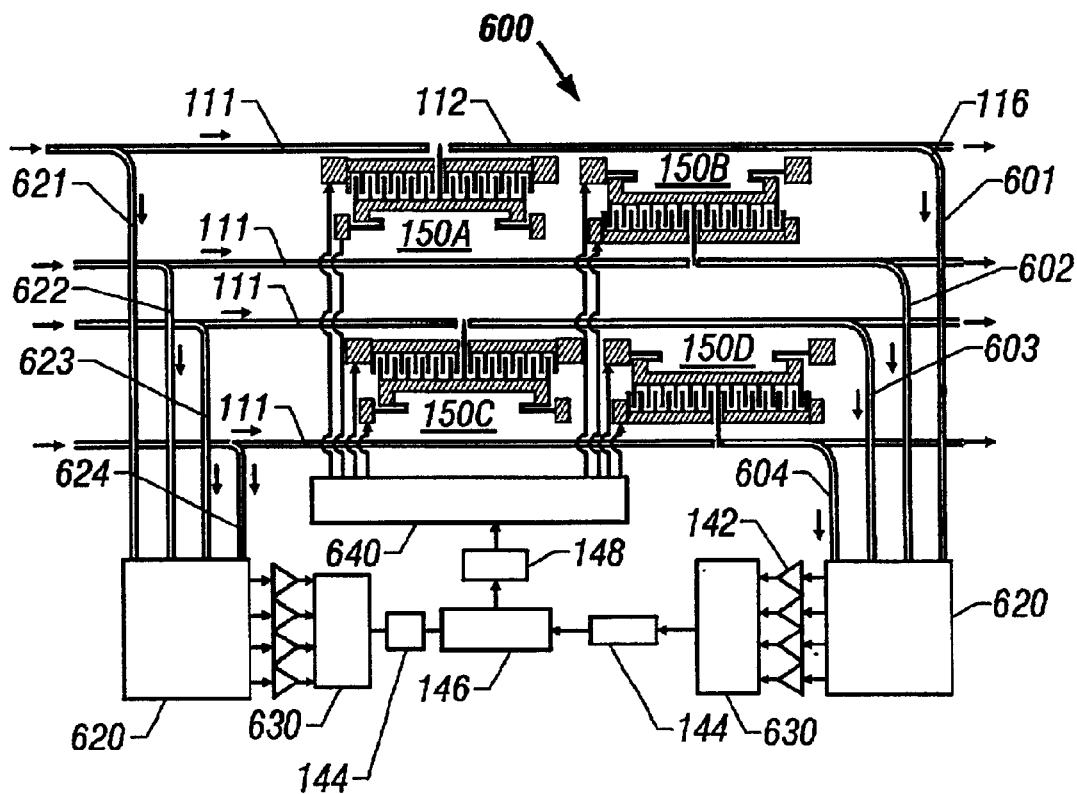
FIGS. 6 and 7 show exemplary integrated variable optical attenuators based on the basic design shown in FIG. 1.

For example, FIG. 6 shows an integrated 4-channel VOA array 600 on the same substrate. An array of fibers 601 through 604 is used to carry the output monitor beams from different channels. An array of fibers 621 through 624 is used to carry input monitor beams from different channels. Detector arrays 620 are used to convert the monitor beams from different channels into electrical signals. Signals 601 through 604 are used to control power output or ratios of signals 601 and 621, 602 and 622, 603 and 623 and 604 and 624. In addition, a signal multiplexer 630 and a signal demultiplexer 640 are used in the feedback control circuit to properly route the signals. The actuators 150A to 150D for different channels are independently controlled to attenuate the optical powers in different channels.

Figure 7:
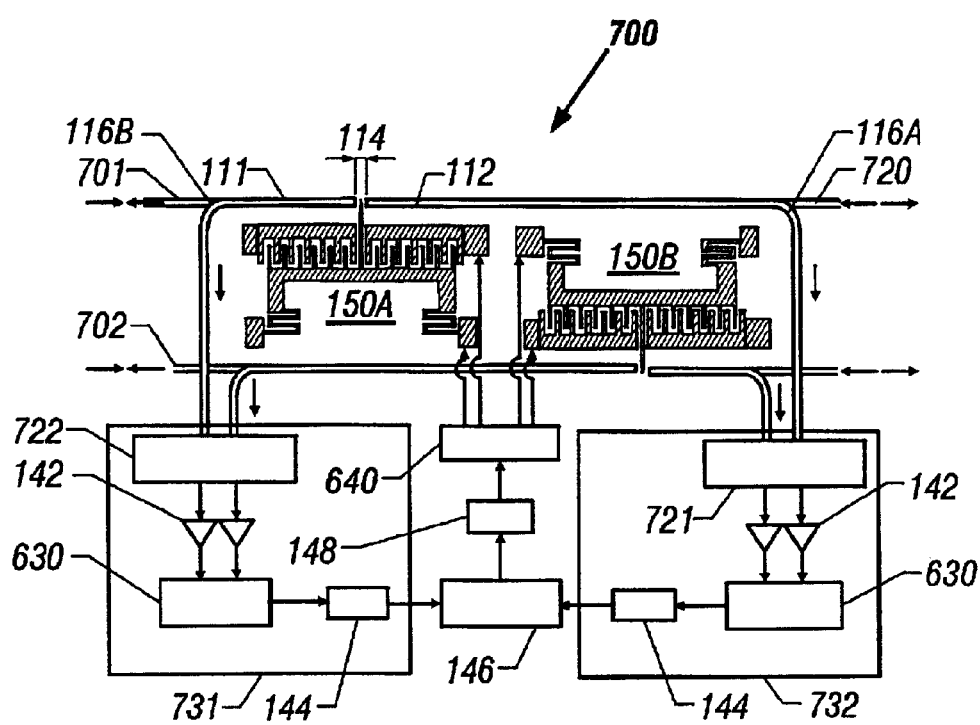

As another example, FIG. 7 shows a two-channel VOA 700 where each channel 701 or 702 can variably attenuate the optical signal in two directions by using the actuators 150A and 150B. The channel 701 is formed of fibers 111 and 112 with a gap 114. Two beam splitters 116A and 116B are used. Each beam splitter is designed to split the input beam in only one direction. Hence, the beam splitter 116A splits the beam 701 but not the beam 720 in the opposite direction. The optical detection and the feedback control are also illustrated, where the detector modules 721 and 722 are coupled to detect light in two opposite directions. A common control processor 146 is used to produce the proper feedback control signals to the actuators 150A and 150B, respectively.

Figure 8A:
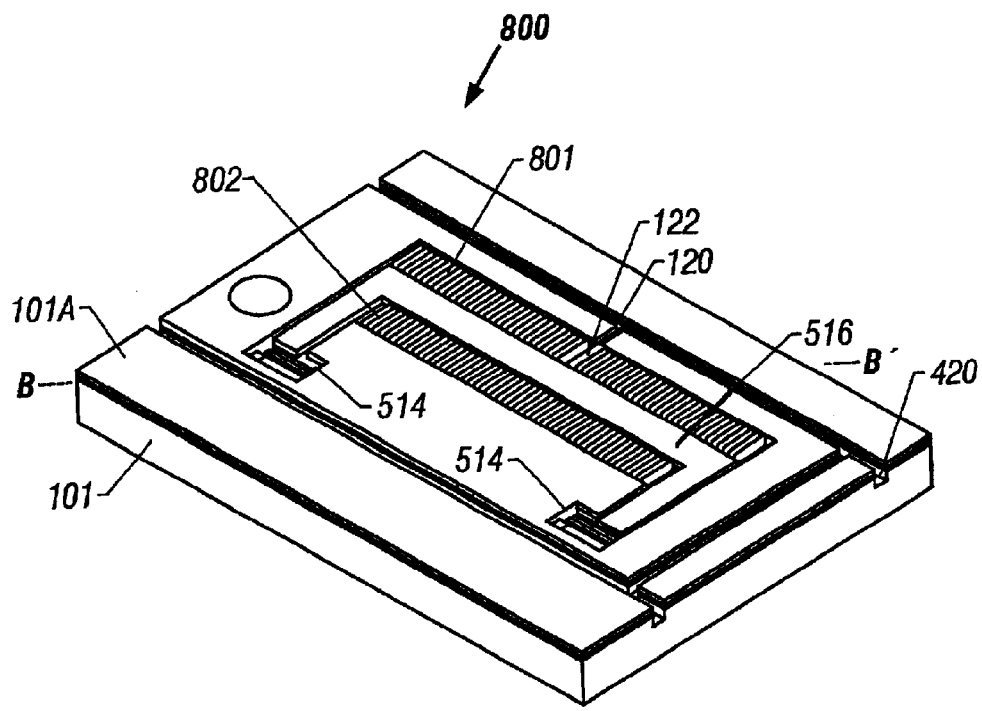
FIGS. 8A, 8B, and 8C show detailed structure of the device in FIG. 5 that has two substrates integrated together to form the electrostatic rotational comb actuator and the micro blade.
Figure 8B:
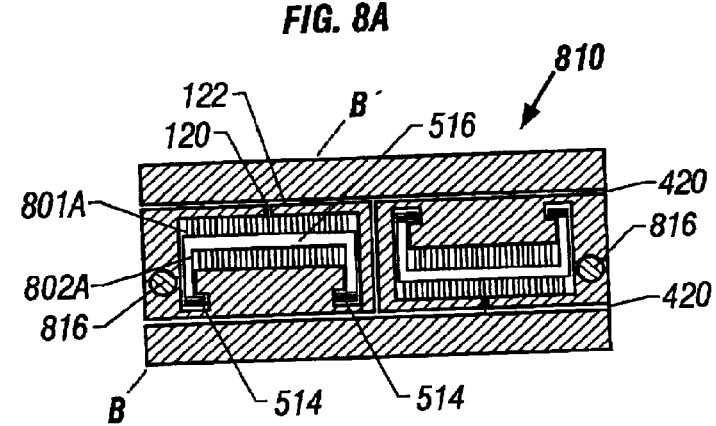
Figure 8C:
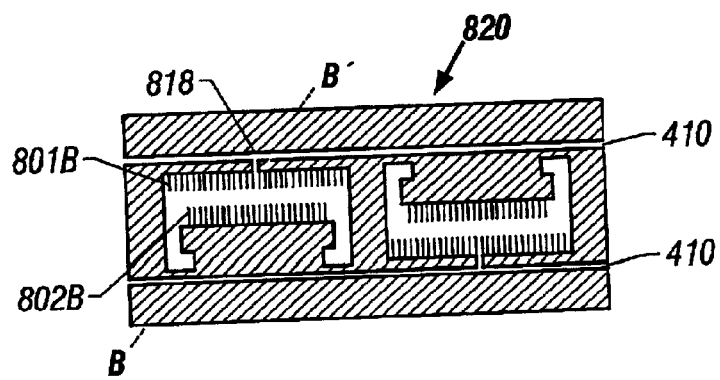

FIGS. 8A, 8B, and 8C show the structure of a portion of a 2-channel VOA 800 based on an electrostatic rotational comb actuator. Similar to the electrostatic rotational comb actuator 500 shown in FIGS. 5A and 5B, the integrated VOA 800 has a top part 810 fabricated on the top substrate 10A integrated to a bottom substrate 101 and a bottom part 820 fabricated on the bottom substrate 101. The top substrate 101A is fabricated with the movable part of the actuator and the bottom substrate 101 is fabricated with the stationary part of the actuator. Fibers and other components may also be placed on the bottom substrate 101. Different from the electrostatic rotational comb actuator 500 shown in FIGS. 5A and 5B, the VOA 800 uses a dual-comb design with two sets of teeth 801 and 802 in each of the movable and stationary parts to increase the total electrostatic force and the response speed. The teeth lengths and teeth gaps can be designed to enable the dual comb actuator to increase the linearized operating voltage range, the mechanical gain and the damping ratio. It also reduces the maximum teeth length to prevent the teeth vibration and deflection. In FIG. 8A, two sets of movable teeth 801 and 802 are shown to form on the opposite sides of a common bar of the movable arm 516. Only one actuator for one channel is illustrated in FIG. 8A.

FIG. 8B shows micro mechanical structures 810 fabricated on the top substrate 101A for two adjacent actuators. The movable part has two sets of movable teeth 801A and 802A. In addition to the fiber trenches and other actuator parts such as the spring hinges 514, the top substrate 101A is fabricated to include alignment markers for aligning top and bottom substrates 101A and 101, a device isolation trench, and pads 816 for bonding electrical wires. The spring hinges 514 are shown to be thinner than the movable arm 516 and the movable teeth 801A and 802A. This difference in thickness allows the spring hinges 514 to have the desired low spring constant while maintaining the rigidity of the movable arm 516 and the movable teeth 801A and 802A. FIG. 8C shows the corresponding micro mechanical structures 820 fabricated on the bottom substrate 101 with two sets of stationary teeth 801B and 802B.

One technical issue is to set the spacing of the gap 114 (FIG. 1) between the fibers 111 and 112. In general, this may be done by adjusting the positions of the two fibers 111 and 112 with a microscope or other viewing device. When both fibers 111 and 112 are placed in a common groove on the substrate 101, a fiber stop may be fabricated in the groove to simplify the adjustment of the gap 114. Referring back to FIG. 2A, the side wall of the groove may be fabricated to form a protruded feature or a fiber stop 214 at the location where the gap 114 is. This protruded feature 214 has a length equal to the desired spacing between the fibers 111 and 112. Hence, the fibers 111 and 112 may be placed in the groove on the opposite sides of the protruded feature 214 and are pressed against the protruded feature 214 to set the spacing. The dimension of the protrusion feature 214 is sufficiently small to avoid interference with the optical coupling and the movement of the blade 120. FIG. 8C also shows a fiber stop 818 formed at each gap location between two fibers.

Each of the above electrostatic actuators may need a proper electrical bias to simplify the servo control circuit and to optimize its operation and performance. The displacement of the actuator may vary with the driving voltage in a nonlinear fashion. However, it is discovered that such an actuator usually has a limited operating range within which the response is approximately linear. There are advantages to operating the actuator in this linear range to accurately control the position of the blade and to achieve a sensitive control. In addition, a high damping ratio can be achieved. It is discovered that, the actuator may be electrically biased to be within the linear response range.

Figure 9A:
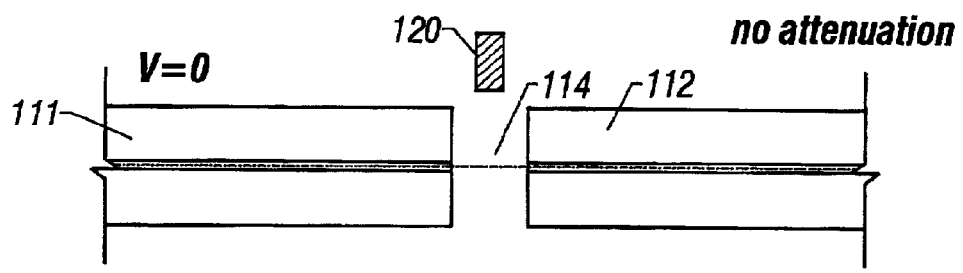
FIGS. 9A through 9D show operating positions of the blade.
Figure 9B:
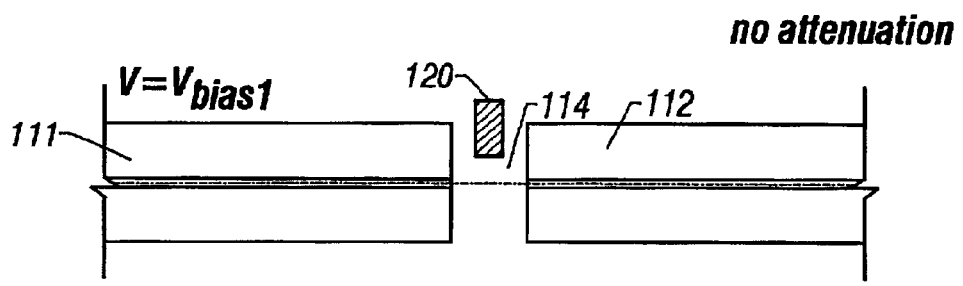
Figure 9C:
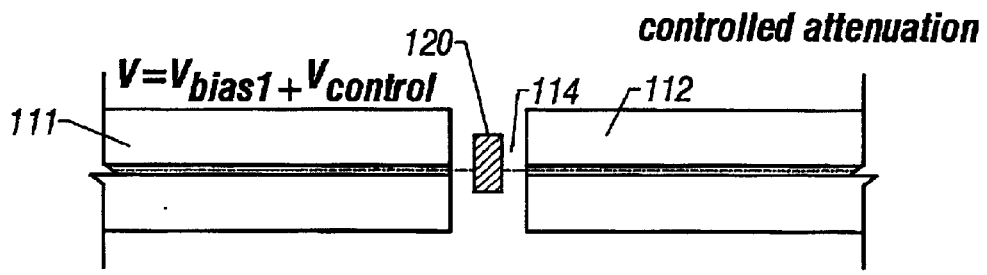
Figure 9D:
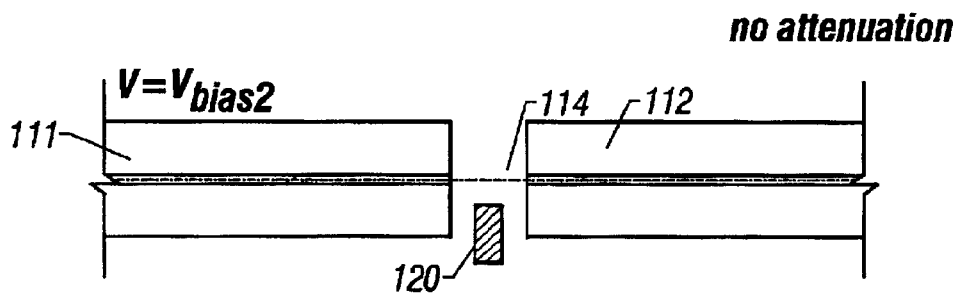

FIGS. 9A, 9B, 9C, and 9D show the blade positions in the gap 114 with different driving voltages on the rotational comb actuator. FIG. 9A shows the blade position without any driving voltage, where the actuator places the blade 120 out of the optical path in the gap 114. There is no light attenuation at this state. FIG. 9B shows the blade position with a bias driving voltage to place the blade 120 closer to the optical path in the gap 114 but without intercepting the optical beam. This bias voltage also places the actuator in the linear response range. FIG. 9C shows the blade position with the bias voltage plus the control voltage to place the blade 120 in the optical path to attenuate the light. The fiber trench in the bottom substrate 101 is designed to intentionally place the fiber at a low position away from the natural position of the blade 120 when no voltage is applied to the actuator. Under this condition, the rotational actuator needs a bias voltage to place the blade 120 to the threshold to start the light attenuation in response to the control voltage added to the bias voltage. With this bias voltage the mechanical gain can be increased and the electrical damping effect for the rotational comb actuator can be utilized. FIG. 9D shows another bias configuration. A larger bias voltage is needed to move the blade 120 to the other side of the optical path without attenuating the light intensity. A control voltage can be applied to reduce the total voltage and move the blade upward in order to reduce the light intensity.

The operation modes shown in FIGS. 9A–9D are "constant on" VOA where the VOA is designed to place the blade 120 out of the optical path between the fibers 111 and 112 and thus does not attenuate the light in the absence of the control signal. The VOAs disclosed in this application may also be designed in a "constant off" configuration where the blade is positioned to totally intercept light without the control signal. This may be realized by either applying a bias voltage to force the blade to move to the middle of the light or by a blade mechanically designed to be in the middle position without any bias.

Figure 10:
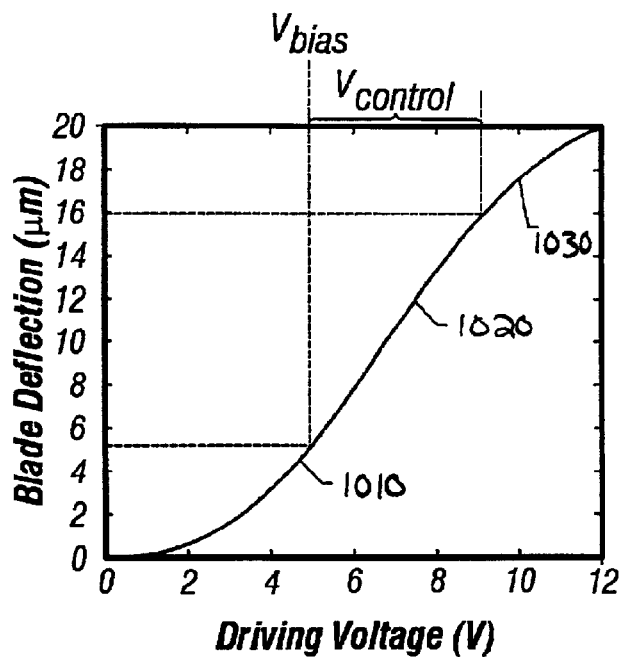
FIG. 10 shows the blade displacement vs. voltage plot and the operating voltage range with a bias voltage.

FIG. 10 shows a typical response of the rotational comb actuator in terms of the blade position as a function of the driving voltage. At low voltage range 1010, the response is nonlinear and is relatively insensitive. At the high voltage range 1030, the response is also nonlinear and relatively insensitive. In the middle range 1020, the blade position is relatively linear and sensitive to the driving voltage change. Hence, the driving voltage should be biased to set the actuator in the operating range 1020.

Figure 11:
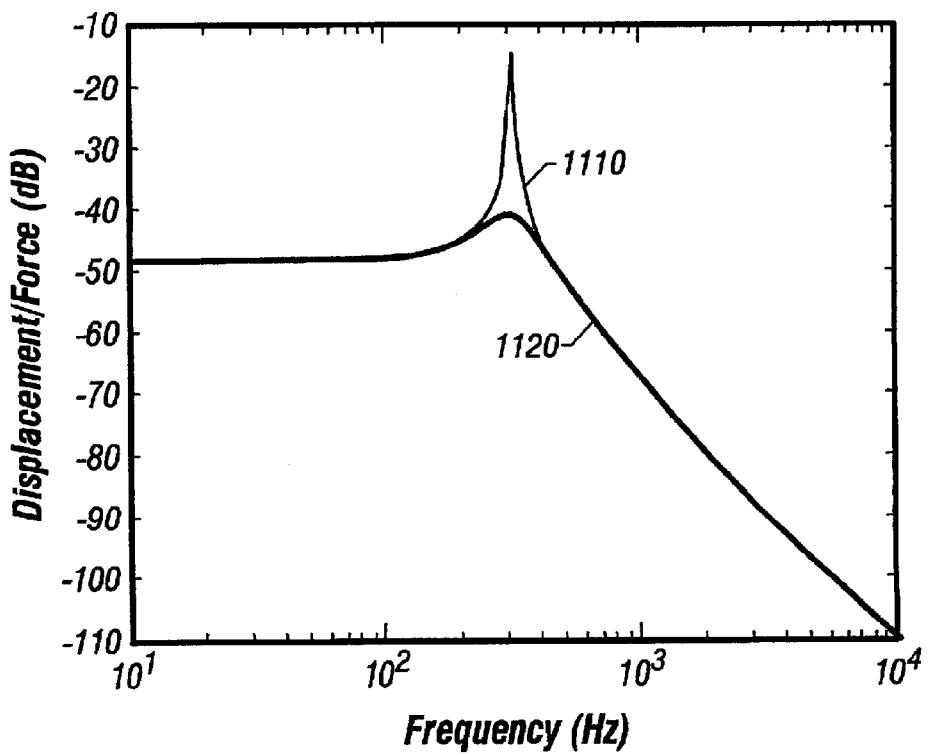
FIG. 11 illustrates frequency responses of an electrostatic rotational comb actuator with and without a bias.

FIG. 11 shows the frequency responses of the blade with and without the bias voltage for the rotational comb actuator to illustrate another advantage of the biasing. The bias voltage provides a large damping effect so the peak 1120 of the mechanical resonance is much lower than the peak 1110 of the mechanical resonance without the bias voltage.

Figure 12A:
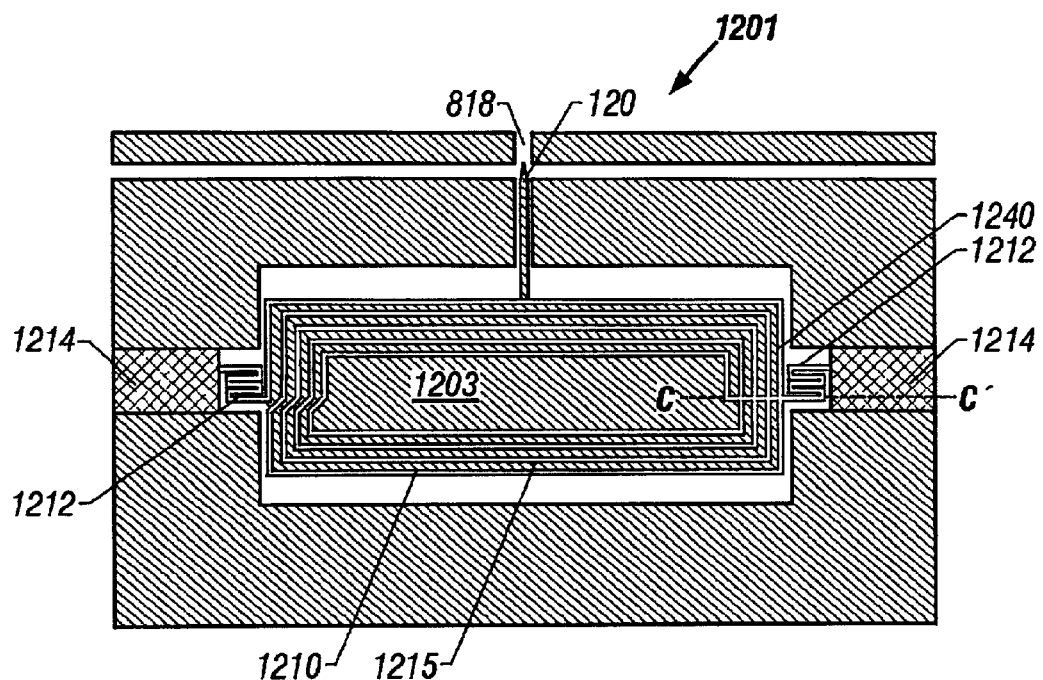
FIGS. 12A, 12B, and 12C show an electromagnetic actuator and the micro blade formed in two substrates integrated together.
Figure 12B:
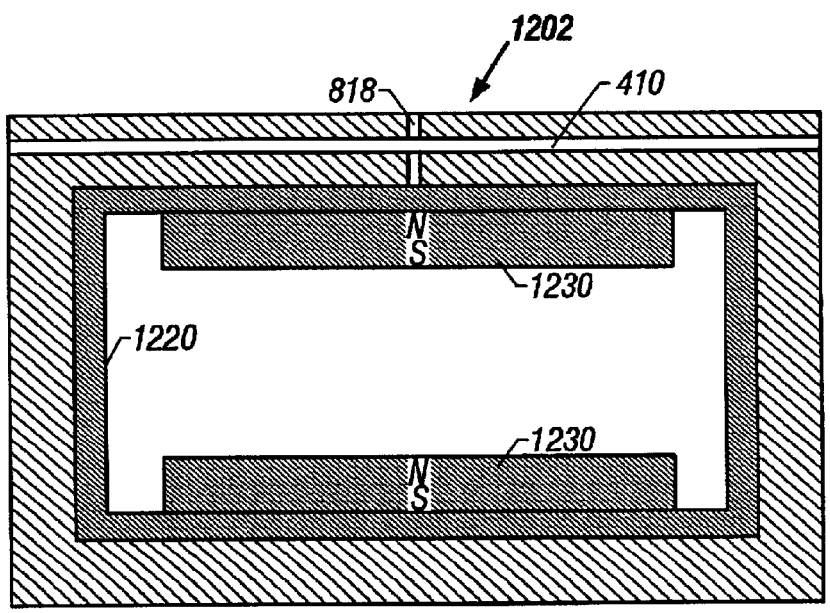
Figure 12C:
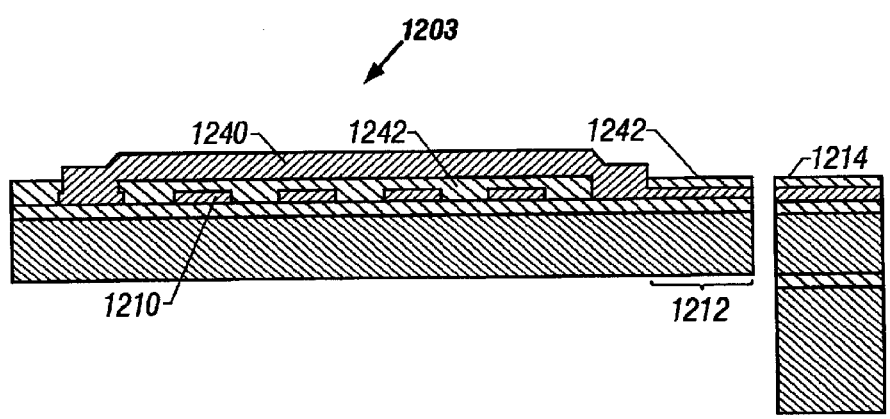

FIGS. 12A, 12B, and 12C show an electromagnetic actuator that may be used as the actuator 150 for the VOA 100 shown in FIG. 1. Similar to the electrostatic actuators, this electro-magnetic actuator also has a movable part formed on one substrate 1201 as shown in FIG. 12A and a stationary part formed on another substrate 1202 as shown in FIG. 12B. The substrate 1201 is patterned to have a movable membrane 1203 and two spring hinges 1212 to movably engage the membrane 1203 to the other stationary part 1214 of the substrate 1201 for rotation around the rotational axis defined by the hinges 1212. A coil 1210 of conductive wires is formed and fixed to the membrane 1203. The support 122 and the micro blade 120 are fabricated as integral parts of the movable membrane 1203 and thus move with the coil 1210. The coil 1210 is electrically connected to the surrounding substrate 1214 with conductive leads that run along hinges 1212 to receive a driving current from an external current source. FIG. 12B shows the structures of the bottom substrate 1202. Magnets 1230 are engaged to the substrate 1202 to provide the magnetic field in which the coil 1210 rotates in response to a driving current. A back iron 1220 is also formed on the substrate 1202 to provide the return path of the magnetic field as part of the magnetic circuit. FIG. 12C shows a cross sectional view of the structure 1203 on top substrate 1201 along the line CC' shown in FIG. 12A. A conductive lead 1240 is shown to cross over the wires in the coil 1210 to connect the terminal of the coil 1210 in the center to one hinge 1212 for connecting to the current source. The lead 1240 is separated from the other parts of the coil 1210 by an insulating layer 1242.

The above structures for rotational actuator designs may also be used to construct other types of actuators. For example, a piezo-electrical transducer may be used and formed on the top substrate to cause the movement of the micro blade. In addition, a thermal element may be used to cause the movement of the micro blade through thermal expansion. Furthermore, the actuator may be designed to cause linear motion of the micro blade.

Figures 1, 13A:
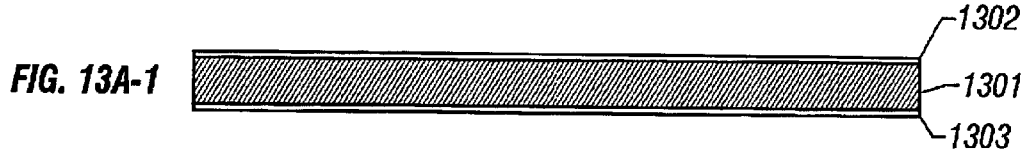
Figures 2, 13A:
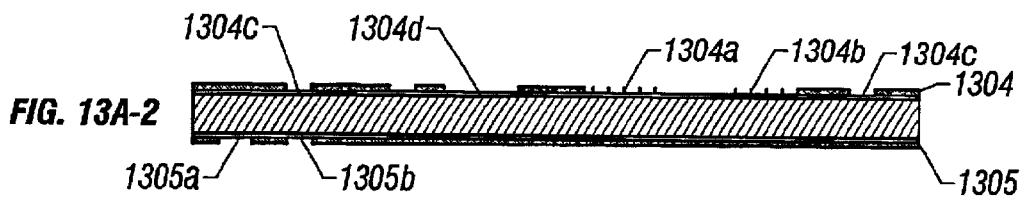
Figures 3, 13A:
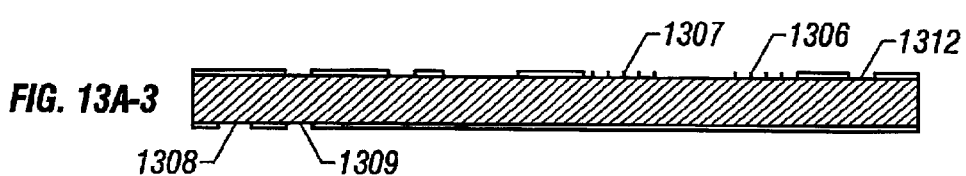
Figures 4, 13A:
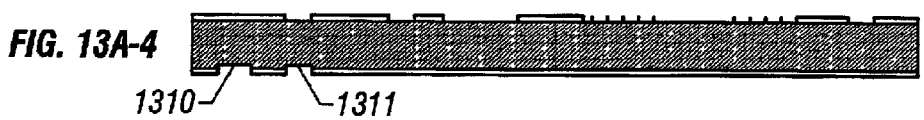
Figures 5, 13A:
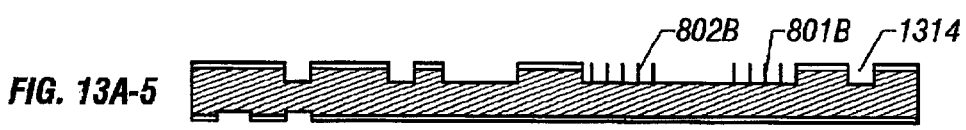
Figures 6, 13A:
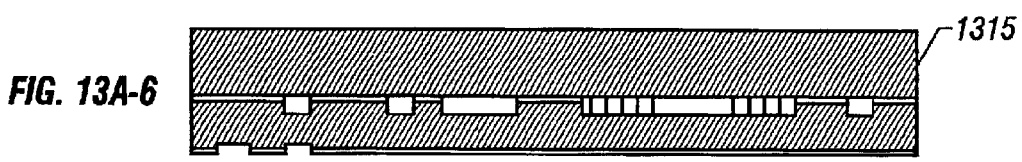
Figures 7, 13A:
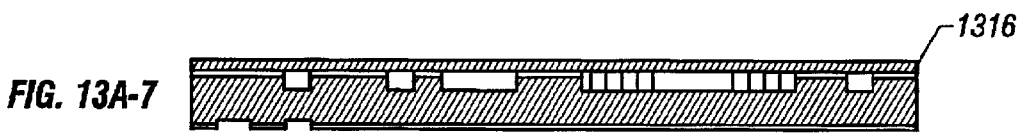
Figures 8, 13A:
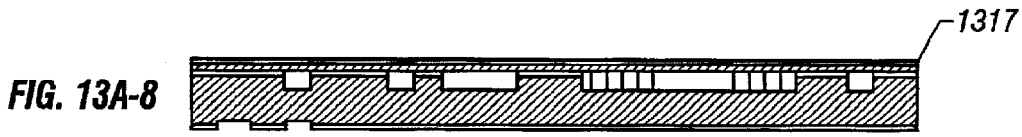
Figures 1, 13B:
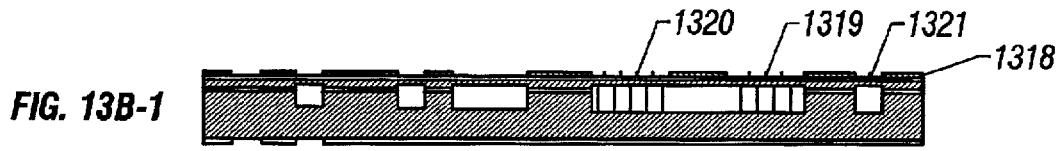
Figures 2, 13B:
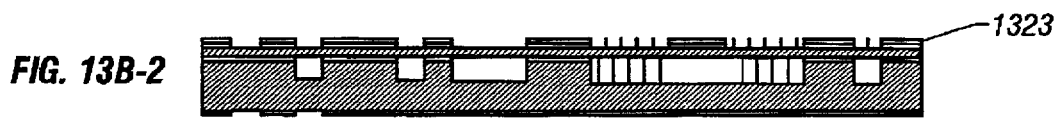
Figures 3, 13B:
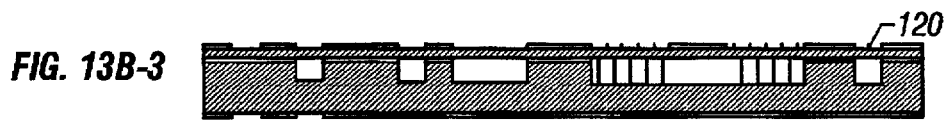
Figures 4, 13B:
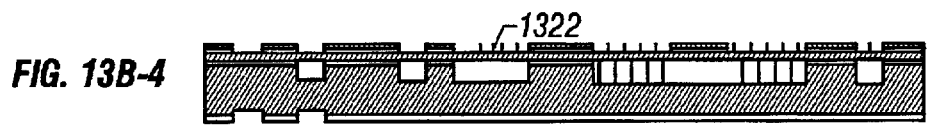
Figures 5, 13B:
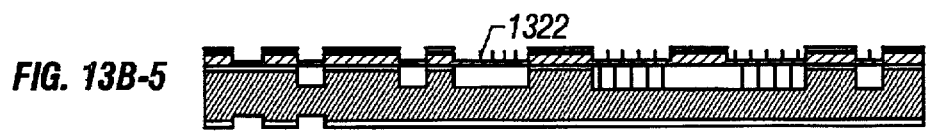
Figures 6, 13B:
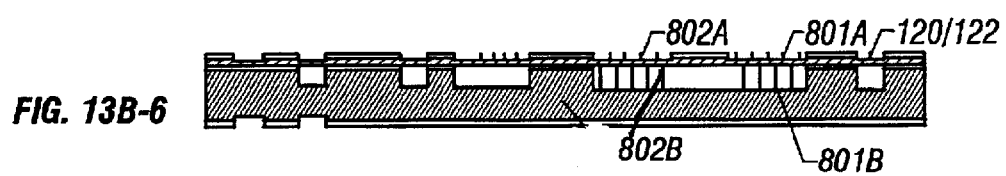
Figures 7, 13B:
Figures 8, 13B:
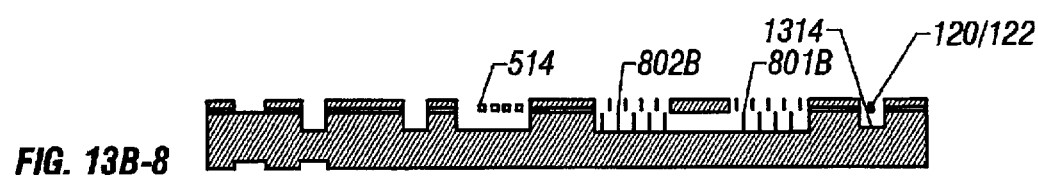

FIGS. 13A and 13B show fabrication steps for fabricating the dual-comb electrostatic VOA of FIGS. 8A, 8B, and 8C. The cross sectional views are taken along the direction BB' shown in FIGS. 8A, 8B, and 8C. The single-comb electrostatic VOA in FIGS. 5A and 53 may also be fabricated this way.

Initially, two substrates 1301 and 1315 of a suitable material, such as Silicon (Si) in this example, are prepared for being processed. Alternatively, the wafer 1301 may be a silicon-on-insulator (SOI) wafer. FIG. 13A-$a$ shows that, the both sides of the substrate 1301 are coated with SiO2 layers 1302 and 1303 by, e.g., an thermal oxidizing process, by sputtering or ion beam deposition. Next, photoresist layers 1304 and 1305 are formed on both top and bottom SiO2 layers 1302 and 1303 and are patterned through a photolithography to form a top patterned mask 1304$a$ through $d$ and a bottom patterned mask 1305 for alignment markers 1305$a$ and separation lines 1305$b$ (FIG. 13A-$b$). The top patterned mask 1304 has patterns for stationary parts of the actuator, including areas 1304$a$, 1304$b$ for two sets of stationary teeth 801B, 802B, areas 1304$c$ for fiber grooves 420 and the trench 818, areas 1304$d$ for forming a void under the hinges 514.

Next, the SiO$_2$ layers 1302 and 1303 are etched by, e.g., a wet or dry etching process, according to the patterns of the masks 1304 and 1305, respectively, to expose the unmasked portions of Si surfaces of the substrate 1301. The mask layers 1304 and 1305 are then removed to form the structure shown in FIG. 13A-$c$, where the SiO$_2$ layers 1302 and 1303 are patterned. A process of etching exposed Si areas on the bottom surface of the substrate 1301 follows to form the alignment markers 1310 and 1311 with a depth of, e.g., about tens of microns (FIG. 13A-$d$). The exposed Si areas on the top surface of the substrate 1301 are then etched to a desired depth, e.g., about 100 microns, to form the stationary teeth 801B, 802B, etc. as shown in FIG. 13A-$e$. Etching of Si may be achieved by using the reactive ion etching process. When SOI wafer is used, silicon dioxide acts as an etch stop, which results in uniform depth of trench 1314 across the wafer. Controlled, uniform depth of trench 1314 permits precise positioning of fibers. This completes the fabrication of the structures on the bottom substrate 1301.

FIG. 13A-$f$ shows that the top substrate 1315 is bonded to the top surface of the bottom substrate 1301 using a bonding layer, such as a molecular bonding layer, to adhere one side of the substrate 1315 to the top SiO2 layer 1302. The bulk part of the top substrate 1315 is removed and polished to form a thinner Si layer 1316 of about 50 microns shown in FIG. 13A-g. Next in FIG. 13A-h, a layer 1317 of SiO2 is formed on the top surface of the thin Si layer 1316. A lithographic process is then performed to fabricate a patterned photoresist mask layer 1318 to define structures associated with the movable part of the actuator, including areas 1320, 1319 for movable teeth 801A, 802A, areas 1321 for blade 120 and the support arm 122, etc. Next, the exposed SiO2 areas in the layer 1317 are etched to transform the patterns of the photoresist mask 1318 to the SiO2 layer 1317. These are illustrated in FIG. 13B-j. The photoresist mask 1318 is then removed in FIG. 13B-k. Another patterned photoresist mask layer 1330 is formed to cover all SiO2 areas and areas 1322 for the serpentine hinges 514 (FIG. 13B-l). The exposed Si areas 1322, 1320, 1319 and 1321 on the top surface of the thin Si layer 1317 are etched with the photoresist mask to a depth of about 25 microns to form a structure in FIG. 13B-m. The photoresist mask 1330 is then removed (FIG. 13B-n). This exposes the hinge areas 1322 without photoresist or SiO2 protection. The above steps prepare the structure for the release of the movable parts such as the teeth 801A, 801B, the blade 120 and its support arm 122, the hinges 514, and movable bar 516. After removal of the photoresist mask layer 1330, a Si etching process is subsequently performed to etch through the remaining depth of about 25 microns of the Si areas in FIG. 13B-o. Since the hinges 514 are etched in FIG. 13B-o, hinges 514 of a thickness less than the thickness of layer 1017 will form after the etching is stopped upon etching through the areas 1322. The other movable parts including teeth 801A and 8013, and the blade 120 and the support arm 122 have original thickness of layer 1317, about 50 microns in the direction perpendicular to the substrate 1301 (FIG. 13B-o). Thickness values of hinges and movable teeth can be independently varied over a wide range. Finally, the top SiO2 layer 1317 is removed to form the structure in FIG. 13B-p.

One notable feature of the above fabrication process is that the released Si areas 802A, 801A, 120/122 and 514 in FIG. 13B-p are free of SiO$_2$. Hence, the mechanical or thermal stress on such areas is small compared to a released Si area where one of the bottom and the top areas has a SiO$_2$ layer while the other does not. This reduced stress minimizes distortions of the structure and improves the reliability and performance of the actuators by reducing component fatigue caused by the stress.

Alternatively, the above fabrication process may be modified to achieve the same final structure shown in FIG. 13B-p. Referring to FIG. 13A-f, instead of bonding a bare substrate 1315 to the patterned bottom substrate 1301 with a patterned top SiO$_2$ layer 1302, two additional steps are preformed. First, the patterned SiO$_2$ layer 1302 in FIG. 13A-e is removed from the bottom substrate 1301. Second, a uniform layer of SiO$_2$ is formed on the surface to be bonded of the substrate 1315. This uniform layer of SiO$_2$ is then bonded to the bare Si areas on the top surface of the bottom substrate 1301. Under this process, the structures shown in FIGS. 13A-f through 13B-m all have uniform SiO$_2$ layer under the thin Si layer 1316. In the release etching step, however, an isotropic gaseous etching with HF is performed to remove both Si and the SiO$_2$ underneath the thin Si layer 1316 to obtain the structure shown in FIG. 13B-p. The SiO$_2$ may be replaced by silicon nitride in the above fabrication processes.

In the above process, the movable teeth and the stationary teeth are formed of Si. Such teeth need to be electrically conductive to effectuate the electrostatic interaction to rotate the movable teeth. One technique is to dope the Si substrates 1301 and 1315 to be conductive prior to the fabrication shown in FIGS. 13A and 13B. Alternatively, the teeth may be coated with one or more metallic layers to be conductive.

When the blade 120 is to be coated with a metal film, two additional fabrication steps are added after step 13B-o in the fabrication flow shown in FIGS. 13A and 13B. An insulating film such as silicon dioxide may be deposited by sputtering or chemical vapor deposition through shadow mask in the area 1314 in order to prevent electrical shorting between layer 1301 and 1317. Subsequently, one or more metallic films are sputtered through the same shadow mask in the opening around region 1314. The electrical shorting may be also prevented without the silicon dioxide deposition by further removing the silicon material surrounding the blade 120 on the top layer 1317.

Figure 14:
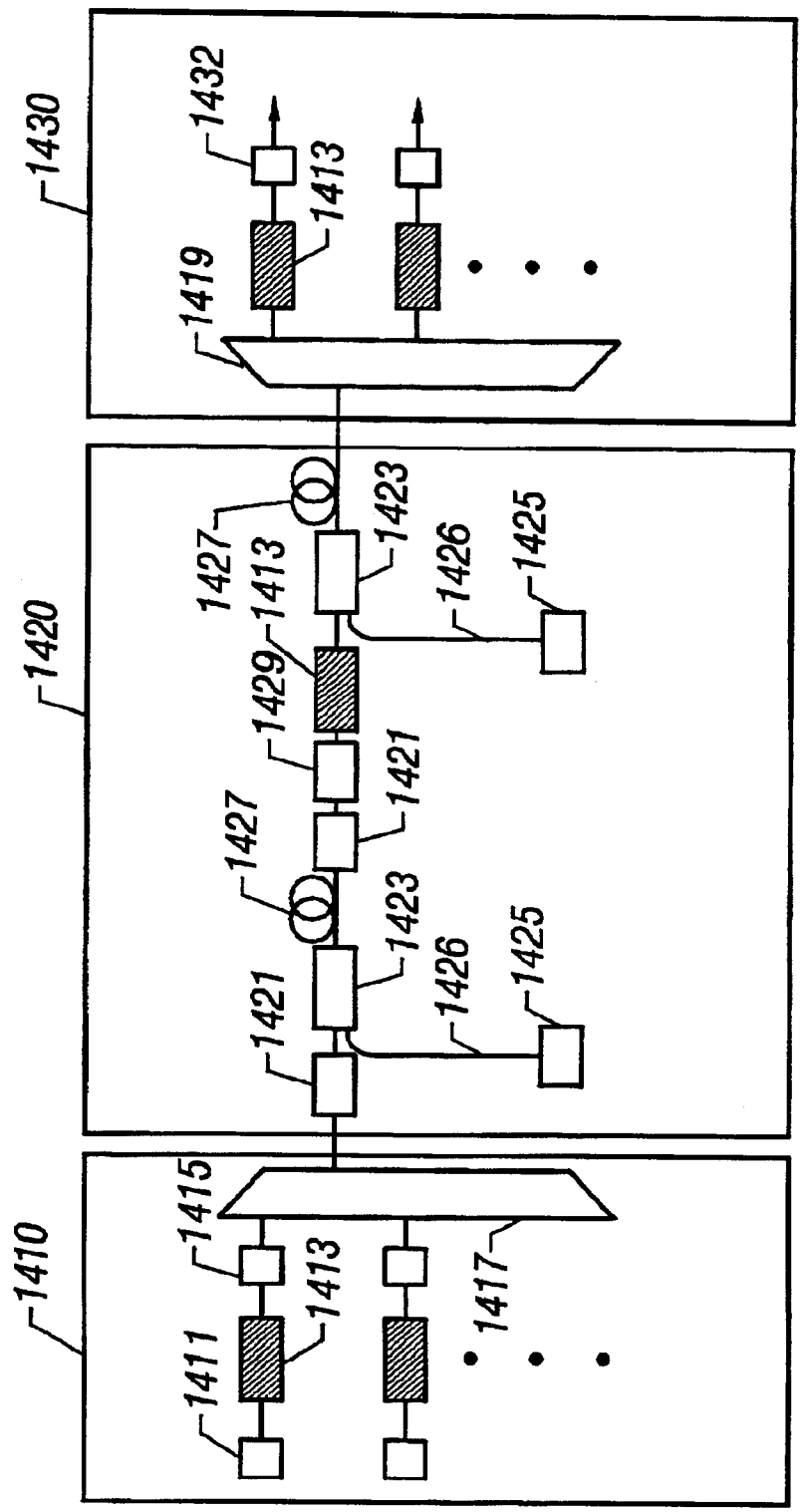
FIG. 14 shows an exemplary Wavelength Division Multiplexing (WDM) system that uses VOAs of the present application.

FIG. 14 shows a WDM system that uses the VOAs based on the disclosure of the present application. This system has a signal transmitter 1410, an amplifier 1420, and a receiver 1430. The transmitter 1410 includes an array of lasers 1411 to respectively produce individual optical signals at different WDM wavelengths. A VOA array 1413 based on the said VOA designs is used to individually adjust power levels of different WDM channels. An array of modulators 1415 is used to modulate individual signals to produce signals to be fed into WDM channels. A WDM multiplexer 1417 is coupled to receive and combine individual WDM channels into WDM signals in a single output fiber. The amplifier 1420 is coupled in the path of the WDM signal to provide amplification. Optical isolators 1421 may be used to reduce adverse optical feedback to the transmitter 1410 and to the first stage EDFA. One or more hi-power lasers 1425 may be used to produce a pump beam 1426. An optical coupler 1423 is used to combine the pump beam 1426 into an EDFA, which amplifies the WDM under excitation by the pump beam. A gain flattening device 1429 may also be used to equalize the optical gains at different WDM channels. A VOA 1413 is inserted between two EDFA to compensate the gain tilt. The receiver 1430 includes a WDM multiplexer 1417, an array of VOAs 1413, and an array of detectors 1432.

Only a few embodiments are disclosed. However, it is understood that variations and enhancements may be made without departing from the spirit of the disclosed embodiments and are intended to be encompassed by the following claims.

What is claimed is:
1. A device, comprising:
a substrate;
a first fiber having a first end facet and fixed on said substrate;
a second fiber, fixed on said substrate and parallel to said first fiber, having a second end facet which opposes said first end facet with a gap to directly receive light from said first end facet without coupling optics therebetween;
a blade having a first blade surface facing said first end facet and forming a first angle with respect to said first end facet and a second blade surface facing said second end facet and forming a second angle with resect to said first blade surface, said blade movably engaged to said substrate to move in and out of said gap at various positions to allow said blade to intercept a variable portion of the beam in said gap to adjust an amount of light directly coupled from said first fiber into said second fiber;

an actuator built on the said substrate and engaged to said blade to adjust a position of said blade in said gap in response to a control signal;

an optical coupler to split a fraction of light received by said second fiber from said second end facet to produce a monitor beam;

an optical detector to receive said monitor beam to produce a detector output; and a feedback circuit, coupled to said optical detector and said actuator to control a position of said blade to control an amount of light received by said second fiber in response to said detector output;

wherein said feedback circuit produces a bias signal to set said actuator to a bias position at which movement of said actuator is damped with respect to a change in said control signal to said actuator.

2. The device as in claim 1, wherein said actuator includes two serpentine torsional hinges which define a rotational axis around which said actuator rotates said blade.

3. The device as in claim 1, wherein said actuator includes two serpentine hinges.

4. A method, comprising:

causing end facets of two fibers to face each other with a gap;

causing said gap to be at a value to allow for direct optical coupling between said two fibers without coupling optics therebetween to have an optical loss less than about 1 dB; and causing a blade to move in said gap to interfere with said direct optical coupling by optical refraction or reflection, wherein said blade has a blade surface at an angle with respect to an end facet of a fiber that outputs light to said blade surface;

wherein said blade is engaged to a rotational actuator which has a set of stationary conductive teeth and a set of movable teeth interleaving with said stationary teeth, wherein said stationary and said movable teeth interact electrostatically to move said movable teeth in response to a potential difference, the method further comprising;

causing a bias in said potential difference to make said rotational actuator respond approximately linearly and with damping with respect to a change in said potential difference.

5. The method as in claim 4, further comprising:

causing a fraction of light coupled through said gap to be converted into an electrical signal indicative of an amount of light coupled through said gap; and causing a position of said blade in said gap to be controlled according to said amount of light to control said amount of light coupled through said gap.

6. A device, comprising:

a substrate;

a first fiber having a first end facet and fixed on said substrate;

a second fiber, fixed on said substrate and parallel to said first fiber, having a second end facet which opposes said first end facet by a gap to directly receive light from said first end facet without coupling optics therebetween;

a blade having a first blade surface facing said first end facet and forming a first angle with respect to said first end facet and a second blade surface facing said second end facet and forming a second angle with respect to said first blade surface, said blade movably engaged to said substrate to move in and out of said gap at various positions some of which allow said blade to intercept at least a portion of the beam in said gap to vary an amount of light directly coupled from said first fiber into said second fiber; and an actuator located on said substrate and engaged to said blade to control motion of said blade, wherein said actuator is an integrated micro mechanical device with a stationary part and a movable part with a first set of movable conductive teeth, said movable part movably engaged to said stationary part to have positions at which said movable teeth spatially interleave with said stationary conductive teeth to electrostatically interact to control movement of said movable part in response to a control voltage applied between said stationary conductive teeth and said movable conductive teeth;

wherein said substrate includes a groove in which said first and said second fibers are located, said groove having a protruded feature at a location of said gap and with a length along said groove to be equal to a desired spacing of said gap, and wherein said first and said second fibers are placed on opposite sides of said protruded feature to have said first end facet and said second end facet positioned to contact said protruded feature.

7. A method, comprising:

causing a layer of a selected material to be formed over a substrate surface;

causing said layer to be processed to form a first pattern that selectively exposes and covers said substrate surface;

causing exposed areas on said substrate surface to be etched to a first depth;

causing a second substrate to be bonded to said patterned layer over said substrate surface;

causing said second substrate to be thinned to a desired thickness to form a thin layer;

causing a second layer of said selected material to be formed over a second substrate surface of said second substrate that is opposite to said surface bonded to said patterned layer;

causing said second layer to be processed to form a second pattern that selectively exposes and covers said second substrate surface, wherein selectively covered areas include a first group and a second group;

causing a photoresist mask layer to be formed over said second layer in only said first group to leave said second layer in said second group exposed;

causing exposed areas on said second substrate surface to be etched to a first depth without penetrating said thin layer to form first etched exposed areas;

causing said exposed second layer in said second group that is not covered by said photoresist mask layer to be removed by a dielectric etching process without etching exposed areas on said second substrate surface;

causing etching of exposed areas on said second substrate surface including said first etched exposed areas and areas of said second group that are above said first etched exposed areas on said second substrate surface;

causing said etching to be stopped when said first etched exposed areas are etched through to make exposed areas in said second group thinner than said areas in said first group; and causing said second layer covering said first group to be removed.

8. The method as in claim 7, wherein said substrate material includes silicon and said selected material includes silicon oxide or silicon nitride.

9. The method as in claim 7, wherein said substrate material includes a silicon-on-insulator.

10. An optical attenuator comprising:
   a. a first facet launching an optical beam;
   b. a second facet separated from the first facet by a gap and positioned to receive the optical beam;
   c. a blade extending through the gap and intersecting at least a portion of the beam, the blade including:
      i. a first blade surface facing the first facet; and
      ii. a second blade surface facing the second facet;
      iii. wherein the first and second blade surfaces are nonparallel;
   d. an electromechanical actuator connected to the blade and adjusting the blade within the gap in response to control signals; and
   e. a control circuit electrically connected to the actuator and generating the control signals;
   f. wherein the control circuit electrically biases the control signals to place the electro-mechanical actuator in a linear response range when intersecting the portion of the optical beam;
   g. wherein the actuator comprises a plurality of movable teeth, connected to the blade, and a plurality of stationary teeth; and
   h. wherein the actuator is a rotational actuator.

11. An optical attenuator comprising:
   a. a first facet launching an optical beam;
   b. a second facet separated from the first facet by a gap and positioned to receive the optical beam;
   c. a blade extending through the gap and intersecting at least a portion of the beam, the blade including:
      i. a first blade surface facing the first facet; and
      ii. a second blade surface facing the second facet;
      iii. wherein the first and second blade surfaces are nonparallel;
   d. an electromechanical actuator connected to the blade and adjusting the blade within the gap in response to control signals; and
   e. a control circuit electrically connected to the actuator and generating the control signals;
   f. wherein the control circuit produces a bias signal setting the actuator to a bias position at which movement of the actuator is damped with respect to a change in the control signals.

12. The attenuator of claim 11, wherein the electromechanical actuator is an electromagnetic actuator.

13. An attenuator comprising:
   a. a first facet launching a beam;
   b. a second facet separated from the first facet by a gap and receiving the beam;
   c. a blade extending through the gap and intersecting at least a portion of the beam, the blade attenuating the portion of the beam by refraction;
   d. an electromechanical actuator connected to the blade and adjusting the blade within the gap in response to control signals; and
   e. a control circuit electrically connected to the actuator and generating the control signals;
   f. wherein the actuator comprises a plurality of movable teeth, connected to the blade, and a plurality of stationary teeth; and
   g. wherein the actuator is a rotational actuator.

14. An attenuator comprising:
   a. a first facet launching a beam;
   b. a second facet separated from the first facet by a gap and receiving the beam;
   c. a blade extending through the gap and intersecting at least a portion of the beam, the blade attenuating the portion of the beam by refraction;
   d. an electromechanical actuator connected to the blade and adjusting the blade within the gap in response to control signals; and
   e. a control circuit electrically connected to the actuator and generating the control signals;
   f. wherein the control circuit produces a bias signal setting the actuator to a bias position at which movement of the actuator is damped with respect to a change in the control signals.

15. The attenuator of claim 14, the blade including a first blade surface facing the first facet and a second blade surface facing the second facet, wherein the first and second blade surfaces are nonparallel.

16. The attenuator of claim 14, wherein the blade is transparent.

17. The attenuator of claim 14, wherein the electromechanical actuator is an electro-magnetic actuator.

* * * * *